US006853867B1

(12) United States Patent
Klindt et al.

(10) Patent No.: US 6,853,867 B1
(45) Date of Patent: Feb. 8, 2005

(54) INTERFACE TO A PROGRAMMABLE LOGIC CONTROLLER

(75) Inventors: Charles J. Klindt, Windham, NH (US); Richard A. Baker, Jr., West Newbury, MA (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 09/223,349

(22) Filed: Dec. 30, 1998

(51) Int. Cl.[7] .............................................. G05B 15/00
(52) U.S. Cl. ............................ 700/83; 700/67; 700/79
(58) Field of Search ................................. 700/79, 83, 9, 700/69, 96, 169; 709/218; 702/182; 707/102

(56) References Cited

U.S. PATENT DOCUMENTS

| | | | |
|---|---|---|---|
| 3,971,000 A | 7/1976 | Cromwell | |
| 4,319,338 A | 3/1982 | Grudowski et al. | |
| 4,669,040 A | 5/1987 | Pettit et al. | 700/42 |
| 4,688,167 A | 8/1987 | Agarwal | |
| 4,845,644 A | 7/1989 | Anthias et al. | |

(List continued on next page.)

FOREIGN PATENT DOCUMENTS

| | | |
|---|---|---|
| DE | 441 0 171 C1 | 4/1997 |
| DE | 296 22 133 | 7/1997 |
| DE | 196 15 093 A1 | 10/1997 |
| EP | 0 542 657 A1 | 5/1993 |
| EP | 0 814 393 A1 | 12/1997 |
| EP | 0 825 506 | 2/1998 |
| JP | 60192447 | 9/1985 |
| WO | WO 96/31047 A | 3/1996 |
| WO | WO 97/07486 A | 2/1997 |
| WO | WO 97/18636 | 5/1997 |
| WO | WO 98/53581 | 11/1998 |

OTHER PUBLICATIONS

Webopedia's definition of JavaBeans:; Aug. 19, 1997.*
RFC 1533 "DHCP Options and BOOTP Vendor Extensions", (http://left.org/rfc/rfc1533.txt) IETF, Oct. 1993.
RFC 1534 "Interoperation between DHCP and BOOTP", (http://ietf.org/rfc/rfc1534.txt) IETF, Oct. 1993.
RFC 2131 "Dynamic Host configuration Protocol" ((http://ietf.org/rfc/rfc21231.txt) IETF, Mar. 1997.
SOAP, Simple Object Access Protocol (1.1) W3C Note May 8, 2000, (http://www.w3.org/TR/2000/NOTE-SOAP-20000508.

(List continued on next page.)

*Primary Examiner*—Emanuel Todd Voeltz
*Assistant Examiner*—Ronald D Hartman, Jr

(57) ABSTRACT

An apparatus is provided for accessing, controlling and monitoring a programable logic controller with a network client having a conventional web browser. The apparatus includes an archive, an interface, and a library. The archive provides for compiling an application written in code supported by the web browser. The interface is responsive to the application for establishing a connection between the controller and the network client. Further, the library is responsive to the application for supporting communication between the controller and the network client upon establishing a connection therebetween.

17 Claims, 3 Drawing Sheets

U.S. PATENT DOCUMENTS

| | | |
|---|---|---|
| 4,858,152 A | 8/1989 | Estes |
| 4,897,777 A | 1/1990 | Janke et al. |
| 4,912,623 A | 3/1990 | Rantala et al. |
| 4,918,690 A | 4/1990 | Markkula, Jr. et al. ..... 370/400 |
| 4,937,777 A | 6/1990 | Flood et al. |
| 4,949,274 A | 8/1990 | Hollander et al. |
| 4,953,074 A | 8/1990 | Kametani et al. |
| 4,992,926 A | 2/1991 | Janke et al. |
| 5,012,402 A | 4/1991 | Akiyama |
| 5,023,770 A | 6/1991 | Siverling |
| 5,047,959 A | 9/1991 | Phillips et al. |
| 5,072,356 A | 12/1991 | Watt et al. |
| 5,072,412 A | 12/1991 | Henderson, Jr. et al. |
| 5,109,487 A | 4/1992 | Ohgomori et al. |
| 5,122,948 A | 6/1992 | Zapolin |
| 5,131,092 A | 7/1992 | Sackmann et al. |
| 5,134,574 A | 7/1992 | Beaverstock et al. |
| 5,151,896 A | 9/1992 | Bowman et al. |
| 5,151,978 A | 9/1992 | Bronikowski |
| 5,157,595 A | 10/1992 | Lovrenich |
| 5,161,211 A | 11/1992 | Taguchi et al. |
| 5,162,982 A | 11/1992 | Mentler ........................ 363/26 |
| 5,165,030 A | 11/1992 | Barker |
| 5,179,700 A | 1/1993 | Aihara et al. |
| 5,225,974 A | 7/1993 | Mathews et al. |
| 5,251,302 A | 10/1993 | Weigl et al. |
| 5,283,861 A | 2/1994 | Dangler et al. |
| 5,297,257 A | 3/1994 | Struger et al. |
| 5,307,463 A | 4/1994 | Hyatt et al. |
| 5,321,829 A | 6/1994 | Zifferer |
| 5,343,469 A | 8/1994 | Ohshima .................... 370/431 |
| 5,349,675 A | 9/1994 | Fitzgerald et al. |
| 5,386,524 A | 1/1995 | Lary et al. .................. 711/206 |
| 5,398,336 A | 3/1995 | Tantry et al. |
| 5,406,473 A | 4/1995 | Yoshikura et al. |
| 5,420,977 A | 5/1995 | Sztipanovits et al. |
| 5,430,730 A | 7/1995 | Sepulveda-Garese et al. .............. 370/254 |
| 5,440,699 A | 8/1995 | Farrand et al. |
| 5,446,868 A | 8/1995 | Gardea et al. |
| 5,528,503 A | 6/1996 | Moore et al. |
| 5,598,536 A | 1/1997 | Slaughter, III et al. |
| 5,611,059 A | 3/1997 | Benton et al. .............. 345/734 |
| 5,613,115 A | 3/1997 | Gihl et al. |
| 5,623,652 A | 4/1997 | Vora et al. |
| 5,625,781 A | 4/1997 | Cline et al. |
| 5,684,375 A | 11/1997 | Chaffee et al. ............. 318/638 |
| 5,699,350 A | 12/1997 | Kraslavsky |
| 5,734,831 A | 3/1998 | Sanders |
| 5,790,977 A * | 8/1998 | Ezekiel ........................ 702/122 |
| 5,793,954 A | 8/1998 | Baker et al. ................. 709/250 |
| 5,801,689 A | 9/1998 | Huntsman ................... 345/733 |
| 5,805,442 A | 9/1998 | Crater et al. |
| 5,862,391 A | 1/1999 | Salas et al. |
| 5,926,621 A * | 7/1999 | Schwarz et al. .............. 714/26 |
| 5,950,006 A | 9/1999 | Crater et al. |
| 5,956,491 A * | 9/1999 | Marks ........................ 709/250 |
| 5,975,737 A | 11/1999 | Crater et al. |
| 5,982,362 A | 11/1999 | Crater et al. |
| 5,990,884 A | 11/1999 | Douma et al. .............. 345/716 |
| 5,997,167 A | 12/1999 | Crater et al. |
| 6,041,287 A * | 3/2000 | Dister et al. ................ 702/182 |
| 6,061,603 A * | 5/2000 | Papadopoulos .............. 700/83 |
| 6,061,721 A * | 5/2000 | Ismael et al. ............... 709/223 |
| 6,085,238 A * | 7/2000 | Yuasa et al. ................ 709/223 |
| 6,108,662 A * | 8/2000 | Hoskins et al. ............. 707/102 |
| 6,134,522 A | 10/2000 | Fritz et al. .................. 704/226 |
| 6,151,625 A * | 11/2000 | Swales et al. ............. 709/218 |
| 6,157,864 A * | 12/2000 | Schwenke et al. ............ 700/79 |
| 6,167,406 A * | 12/2000 | Hoskins et al. ............. 707/102 |
| 6,201,996 B1 * | 3/2001 | Crater et al. .................... 700/9 |
| 6,233,626 B1 | 5/2001 | Swales et al. ................ 710/11 |
| 6,263,487 B1 * | 7/2001 | Stripf et al. .................... 717/1 |
| 6,282,454 B1 * | 8/2001 | Papadopoulos et al. ....... 700/83 |
| 6,311,101 B1 | 10/2001 | Kastner ...................... 700/197 |
| 6,321,272 B1 | 11/2001 | Swales ....................... 709/250 |
| 6,327,511 B1 | 12/2001 | Naismith et al. ............. 700/19 |
| 6,370,550 B1 | 4/2002 | Douma et al. ........... 715/500.1 |
| 6,370,569 B1 * | 4/2002 | Austin ........................ 709/217 |
| 6,424,872 B1 | 7/2002 | Glanzer et al. ............... 700/18 |
| 6,434,157 B1 | 8/2002 | Dube et al. ................. 370/401 |
| 6,453,210 B1 | 9/2002 | Belotserkovsky ............ 700/96 |
| 6,466,995 B2 | 10/2002 | Swales et al. ............... 710/11 |
| 6,484,061 B2 | 11/2002 | Papadopoulos et al. ..... 345/733 |
| 6,505,341 B1 | 1/2003 | Harris et al. ................ 717/100 |
| 6,694,371 B1 * | 2/2004 | Sanai ......................... 709/230 |
| 2002/0176441 A1 | 11/2002 | Swales et al. |

OTHER PUBLICATIONS

Statement of Ken Carter pertaining to awareness of LABTECHnet technology, 1 page.

SOAP, [online], [retrieved on Aug. 5, 2002]. Retrieved from MSDN Online—Default Home Page using Internet <URL:http://msdn.microsoft.com/nhp/ default. asp?contentid=28000523&frame= true>.

PROCOMM Plus—The Leader in terminal emulation, [online], [retrieved on Jan. 13, 2002] Retrieved from the consumer web page of Symantec, Inc. using Internet <URL:http://www.symantec.com/procomm>.

DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http: //www.cs.utk.edu/~shuford/terminal/dcc.html>.

NetReach™ Model TPS–2, TelnetPower Switch 2001, [online], [retrieved on Jan. 13, 2002]. Retrieved from Model TPS–2 Telnet + Dial–Up Remote Power Manager, Remote Reboot of Servers, Route—using Internet <URL:http://www.wti.com/tps2.htm>.

ANSI.SYS, [online], [retrieved on Jan. 13, 2002]. Retrieved from ANSI.SYS—ansi terminal emulation escape sequences using Internet URL:http://enterprise.aacc.cc.md us/~rhs/ansi.html>.

Skonnard, Aaron, "SOAP: The Simple Object Access Protocol," [online], [retrieved on Jul. 30, 2002]. Retrieved from SOAP: The Simple Object Access Protocol—MIND Jan. 2000 Using Internet <URL: http://www.microsoft.com/Mind/0100/soap/soap.asp>.

Extensible Markup language (XML)—W3C Working Draft Aug. 7, 1997, [online], [retrieved on Aug. 1, 2002]. Retrieved from Extensible Markup Language (XML) website using Internet <URL:http://www.w3.org/TR/WD–xml–970807.htm.>.

Remote Interrogation and Control of Sensors via the Internet, Sensors and Systems; Peter L. Fuhr and Euan F. Mowat; University of Vermont; pp. 25–30; Dec. 1999.

Multi–Tech Systems Granted Modem Firmware Upgrade Patent, Apr. 5, 2000, [online], [retrieved on Jan. 3, 2000]. Retrieved from Multi–Tech Press Release using Internet <URL:http://www.multitech.com/NEWS/releases/2001/183.html>.

Walid Mostafa, Mukesh Singhal, "A Taxonomy of Multicast Protocols for Internet Applications," Jul. 18, 1997 from Computer Communications 20 (1998) 1448–1457.

Tilo Klesper, "Der Internet–Zugriff aufs LON," Aug. 1998 from Automatisieren.

David J. Preston, "*Internet Protocols Migrate to Silicon For Networking Devices*" from Electronic Design, Apr. 14, 1997.

IEEE Std 802.11a–1999 (Supplement to IEEE Std 802.11–1999) "Part II: Wireless LAN Medium Access Control (MAC) and Physical Layer (PHY) specifications Higher-speed Physical Layer in the 5 GHz Band" [Adopted by ISO/IEC and redesignated and ISO/IEC 8802–11:1999/Amd 1:2000(E)].

P802.1p/D4 Sep. 6, 1966 "P802.1p Standard for Local and Metropolitan Area Networks—Supplemental to Media Access Control (MAC) Bridges—Traffic Class Expediting and Dynamic Multicast Filtering".

Disk Drive with Embedded Hyper–Text Markup Language Server (IBM Technical Disclosure Bulletin: Dec. 1995) [online], [retrieved on Nov. 9, 2001]. Retrieved using Internet: <ULR:http://www.delphion.com/tdbs/tdb?o–95A%2062530>.

The Trojan Room Coffee Machine [online], [retrieved on Sep. 19, 2001]. Retrieved using Internet: <URL:http://www.cl.cam.ac.uk/coffee/coffee.html>.

Stafford–Fraser, Quentin, "The Trojan Room Coffee Pot A (non–technical) biography" [online], [retrieved on Sep. 19, 2001]. Retrieved using Internet: <URL:http://www.cl.cam.ac.uk/coffee/qsf.coffee.html>.

Stafford–Fraser, Quentin, "The Story of the Trojan Room Coffee Pot A Timeline" [online], [retrieved on Sep. 19, 2001]. Retrieved using Internet: <URL:http://www.cl.cam.ac.uk/coffee/qsf/timeline.html>.

From Web Server to Railroad Layout Interactive Model Railroad [online]. [retrieved on Sep. 19, 2001]. Retrieved using Internet: <URL:http://rr–vs.informatik.uni–ulm.de/rr/LayoutControl.html>.

News Interactive Model Railroad [online], [retrieved on Sep. 19, 2001]. Retrieved using Internet: <URL:http://rr–vs.informatik.uni–ulm.de/rr/WhatsNew.html>.

Frequently Asked Questions Interactive Model Railroad [online], [retrieved on Sep. 19, 2001]. Retrieved using Internet <URL:http://rr–vs.informatik.uni–ulm.de/rr/FAQ.html>.

Putman, Frederick A., "Internet–Based Data Acquisition and Control" Sensors; Nov. 1999, pp. 1–5.

Kao, James T, "Remote Microscope for Inspection of Integrated Circuits," MIT Masters Thesis; Sep. 1995, pp. 1–113, pp. 1–113.

Soreide, N.N. et al., "Mosaic access to real–time data from the TOGA–TAO array of moored buoys," Computer Networks and ISDN Systems, Dec. 1995.

About LabCam [online], [retrieved on Nov. 28, 2001] Retrieved using Internet: <URL:http://people.cs.uchicago.edu/~peterp/LabCam/aboutLabCam.html>.

Bibliography [online], [retrieved on Nov. 16, 2001] Retrieved from Xavier Papers using Internet: <URL:http://www–2.cs.cmu.edu/Groups/xavier/www/papers/html>.

Stafford–Fraser, Quentin, "The Life and Times of the First Web Cam—When convenience was the mother of invention", [online], [retrieved on Sep. 19, 2001]. Retrieved using Internet: <URL:http://www.cl.cam.ac.uk/coffee/qsf/CACM200107.html>.

EDN Access for Design, By Design—Test & Measurement Jun. 6, 1996 [online], [retrieved on Sep. 19, 2001]. Retrieved EDN—Jun. 6, 1996 Test & Measurement using Internet: <URL:http://archives.e–insite.net/archives/ednmag/reg/1996/060696/12prod4.htm>.

Miscellaneous Web pages and documents from LABTECH High Performance Data Acquisition & Process Control Software—20 Years of Industry Innovation in Real–time PC Measurement and Control [online], [retrieved Sep. 18, 2001] Retrieved from LABTECH—20 Years of Industry Innovation in . . . using Internet: <URL:http://www.labtech.com>.

Goldberg, Ken et al; "Beyond the Web: Excavating the Real World Via Mosaic" [online], [retrieved on Apr. 3, 2001]. Retrieved from Beyond the Web Conference Paper using Internet: <URL: http://www.ncsa.uiue.edu/SDG/IT9 . . . golberg.html>.

Goldberg, Ken et al.; "Desktop Teleoperation via the World Wide Web", University of Southern California, IEE International Conference on Robotics and Automation D–7803–1965–6/95 S400, Jun., 1995, pp. 654–659.

News—aX announces Support for Opto 22 Ethernet B3000 Devices—Sep. 13, 2001 [online], [retrieved on Sep. 24, 2001]. Retrieved from automationX using Internet: <URL:http://www.mnrcan.com/newsdetail.phtml?idno=25>.

aX Process Control [online], [retrieved on Sep. 24, 2001]. Retrieved from automationX Process Control using Internet: <URL:http://www.mnrcan.com/ProcessControl.phtml>.

CD–ROM's in the Microwave—What do you do [online], [Retrieved on Jun. 20, 2001]. Retrieved using Internet: <URL:http://www.hamjudo.com/notes/cdrom.html>.

Peryt, M. and Momal, F., "Generic Repository and Search Engine For LHC Equipment Test Data," International Conference on Accelerator and Large Experimental Physics Control Systems, 1999, Trieste, Jul., pp. 493–495.

Momal, F., et al., "A Control System based on Industrial Components for Measuring and Testing the Prototype Magnets for LIIC," [online], [retrieved on Oct. 9, 2001]. Retrieved from A Industrial Control System for Testing the Magnets for LHC using Internet: <URL: http://mish23I.cern.ch/Does/CS/blC.html>.

Web page retrieved on Nov. 16, 2001. Retrieved using Internet: <URL:http://www.awe.com/mark/wwwf94.coxgif3>.

Bradford Robotic Telescope—Intro [online], [retrieved on Nov. 15, 2001]. Retrieved from Introduction to the Bradford Telescope using Internet: <URL:http://www.telescope.org/rti/intro.html>.

Cox, Mark and Baruch, John, "Robotic Telescopes: An Interactive Exhibit on the World–Wide Web," [online], [retrieved on Nov. 16, 2001]. Retrieved from Robotic Telescopes Paper using Internet: URl:http://www.awe.com/mark/wwwf94/wwf94.html>.

Welcome to Paul Haas's web server—Welcome to a historic website [online], [retrieved on Jun. 20, 2001]. Retrieved using Internet: URL:http://www.hamjudo.com/notes/cdrom-.html>.

Status of Paul's (Extra) Refrigerator at Wed Jun. 20 14:32:09 EDT 2001 [online], [retrieved on Jun. 20, 2001]. Retrieved using Internet: URL:http://www.hamjudo.com/cgi–bin/refrigerator>—Soda Can platform [online], [retrieved on Jun. 20, 2001]. Retrieved using Internet: URL:http://www.hamjudo.com/notes/soda_platform.html>.

Scharf, Ronald et al, "Using Mosaic for Remote Test System Control Supports Distributed Engineering" [online], [retrieved on 2001–10–21–03]. Retrieved using Internet: <URL:http://archive:ncsa.uici.edu/SDG/it94/Proceedings/CSCW/scharf/html>.

Goldberg, Ken and Mascha, Michael, "Mercury Project Aug. 1994–Mar. 1995," [online], [retrieved on 2001–9]. Retrieved using <URL:http://www.usc/cdu/dept/raiders>.

Tub status as of Wed Jun. 20 14:44:54 EDT 2001 [online], [retrieved Jun. 20, 2001]. Retrieved from Paul's Hottub status using Internet: <URL:http://hamjudo.com/cgi–bin/hottub>.

Frequently asked questions about Paul's Hottub [online], [retrieved on Jun. 20, 2001]. Retrieved from hottub notes and sources using Internet: <URL:http://hamjudo.com//hottub–notes.html>.

The Cal Poly Computer Society's Robotics Resources Page [online], [retrieved on Jun. 20, 2001]. Retrieved from Computer Society Robotics Resources Page using Internet: URL:http://www.elee.calpoly.edu/clubs/cs/www/RoboContest>.

The "Only" Coke Machine on the Internet [online], [retrieved on Apr. 10, 2001] Retrieved using Internet: URL:http://www.cs.cmu.edu/~coke/history_long.txt>.

1771 Control Compressor (Cat. No. 1771–DMC, –DMC1, –DMC4, and –DXPS) User Manual, Copyright 1994, Allen-–Bradley Company, Inc., Publication 1771 6.5.95–PM 865119–36, Dec. 1994.

Taylor, Ken and Trevelyan, James, "A Telerobot On the World Wide Web," Proceedings of the 1995 National Conference of the Australian Robot Association, Melbourne, Jul. 5–7, Syndey: Australian Robot Association Inc., pp. 108–118.

Taylor, Ken and Trevelyan, James, "Australian Telerobot On the Web," 26$^{th}$ International Symposium on Industrial Robots, 1995, pp. 40–44.

WWWF94'94 Information Form, Sep. 1, 1994, 3 pages.

Xavier has a new job! [online], [retrieved on Nov. 15, 2001]. Retrieved using Internet: URL:http://www–2.cs.cm.edu/Groups/xavier/www>.

Article entitled, "Installing and Using LABTECHnet," 2 pages.

Article entitled, "LABTECHnet Frequently Asked Questions Updated Sep. 16, 1995," 3 pages.

Putnam, Fredrick, "LABTECH News: Another superlative PR article!!!," Oct. 26, 1995, 2 pages.

Purham, Frederick, "Public–domain IPC scheme moves Windows data 1000 times faster than DDE," Personal Engineering and Instrumentation News—Oct. 20, 1994, 15 pages.

Strauss, Richard, three page memo to LABTECH staff, with attached press release—For Release on Oct. 3, 1995 entitled, "Internet Goes Real–time with LAHBTECHnet," 3 pages.

Putnam, Frederick, "LABTECHnet Visualization of a Weather Front," 4 pages.

SoftPLC Corporation—The History of Programmable Controllers, Looking Back From the Year 2000 A.D. (Or, How Computers Replaced Proprietary PLC's), pp. 1–7.

SoftPLC Corporation—TOPDOC: Advanced PLC program development & documentation software, pp. 1–12.

Control Engineering Online Magazine Articles (Jul. 1998)—No, that's not a PC, it's a PLC, pp. 1–2.

Rockwell International Corporation, Allen–Bradley Introduces PLC–5/80E Controller for Ethernet Communication Networks.

Rockwell Automation—Search Results, pp. 1–2.

Rockwell International Corporation, Vision & Direction, The Direction of Automation Systems, pp. 1–4.

Rockwell International Corporation, Vision & Direction, The Role of Open Systems, pp. 1–4.

Rockwell International Corporation—Vision & Direction—The Direction of Automation Systems—Emergence of Application–Specific Control Solutions, pp. 1–2.

Rockwell International Corporation—Vision & Direction—The Direction of Automation Systems—The New Factory Worker, pp. 1–2.

Rockwell International Corporation, Vision & Direction, Control System Deliverables—The Next Step, pp. 1–2.

Rockwell International Corporation, Vision & Direction, Conclusion & Acknowledgments, pp. 1–2.

Rockwell International Corporation—Choices—Perspectives on the Future of Automation Control, p. 1.

Rockwell International Corporation—Allen–Bradley—Networks—Ethernet for Industrial Control—An Ethernet White Paper—Apr. 21, 1998, pp. 1–13.

Rockwell International Corporation—Automation Systems Control—General—World–Class Automation Systems from Allen–Bradley, Last Updated: May 7, 1998, pp. 1–12.

PC Quest, Dec. '97—Point, click, Control—C–Programmable controllers take the pain out of embedded control, pp. 1–2.

berthel—automation with imagination—PCI 100—Programmable logic controller for SIMATIC/IBM IPC, pp. 1–3.

YAHOO! Personalized Search Results for programmable logic controller internet access, pp. 1–3.

Siemens—Simatic report 1/97—New in the Simatic Library, pp. 1–2.

Control Magazine Aug. 1998—Field Test—Dynamic Software Makes Control Integration Easier, pp. 1–2.

Design and Reuse Web Site—EDTN Network—Analyze IP Database Content—Analyse Reuse Blocks per taxonomy tree, pp. 1–10.

Engineering Information, Inc.—Ei CPX WEB 1990–94.

Abstract of "Implementing distributed controls for FMC's using Internet utilities," S. S. Jagdale and N. Merchant; Computers of Industrial Engineering, vol.. 31 No. 1–2, p. 87–90; Oct., 1996 (UK).

Abstract of "Process Control takes to the Net," Greg Paula, Mechanical Engineering vol. 118 No. 12 Dec. 1996, p. 55.

Abstract of "Remote interrogation and control of sensors via the internet," Peter L. Furh and Euan F. Mowat; Sensors, vol. 12 No. 12, 6 pp; Dec. 1995.

Abstract of "Process control takes to the Net," G. Paula; Mechanical Engineering, vol. 118, No. 12, p. 55, Dec., 1996.

Abstract of "Implementation of CAN/CAN bridges in distributed environments and performance analysis of bridged CAN systems using SAE benchmark, " H. Ekiz, A. Kutlu and E. T. Powner; Conference Paper, IEEE Southeastern '97, Engineering the new energy, IEEE, p. 185–7, 1996.

Abstract of "Managing interdisciplinary project teams through the Web," R. E. Goodman and P. Chinowsky; Conference Paper, WebbNet 96—World Conference of the Web Society, pp. 180–5, 1996.

Abstract of "Learning environment for a process automation system using computer networks," J. Lindfors, L. Yliniemi and K. Leivska; Conference Paper, Step. '96—Genes, Nets and Symbols, pp. 137–143, 1996 (Finland).

Abstract of "Distributed agent systems for intelligent manufacturing,"D. H. Norrie and B. R. Gaines; Canadian Artificial Intelligence, No. 40, p. 31–3, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353–8, 1996 (UK).

Abstract of "Chemical–better batch controls," T. Crowl; Contorl & Instrumentation, vol. 28, No. 5, p. 53–4, May 1996 (UK).

Abstract of "Industrial software does 32–bit Windows, prepares for the net," W. Labs; I 8CS, vol. 69, No. 3, p. 23–6, 31–4, Mar. 1996, USA.

Abstract of "A case study for international remote machining," G. C. I. Lin and Kao Yung–Chou; Conference Paper, Proc. SPIE–Int. Soc. Opt. Eng., vol. 2620, p 553–60, 1995.

Abstract of "Standardization of long–distance protocols," R. Dinges; Journal Paper, Generation Changes in Network Conductor Systems, ITG—Fachberichte, vol. 134, p. 97–113, 1995 (West Germany).

Abstract of "Proceedings of AUTOFACT Conference," Soc. Manuf. Eng.,, 684 pp., Dearborn, MI; 1993.

Abstract of "Control system design V. Communications orchestrate process control," F. Glow; In Tech, vol. 36, No. 9, p. 68–74, Sep. 1989.

Abstract of "Functions and characteristics of local networks adapted to industrial applications," J. Morlais; Electronique Industrielle, No. 97, p. 56–63, Nov. 15, 1985; France.

Abstract of "Intelligent supervisory control of submerged–arc furnaces," Markus A. Reuter, Carla Pretorius, Chloe West, Peter Dixon and Morne Oosthuizen, JOM vol. 48, No. 12, Dec. 1996, p. 49–51.

Abstract of "Simulation on the integration of process control systems of rolling mill plants through standard networks, "Choo Young Yeol, Hwang Hwa Won and Kim Cheeha, Proceedings of the Industrial Computing Conference, Instrument Society of America, Research Triangle Park, NC, USA. P 1–14; vol. 6, No. 1, 1996.

Abstract of "Environmental waste control digest," Clayton H. Billings; Public Works vol. 127 No. 7, pp, Jun., 1996.

Abstract of "Experiments in tele–handling and tele–machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts–on–demand on the national network," Fred Hansen, Elias Pavlakos, Eric Hoffman, Takeo Kanade, Raj Reddy, Paul Wright; Journal of Manufacturing Systems, vol. 12 No. 4, p. 269–281; 1993.

Abstract of "Mathematical model and optimization of furfurtal treating process," Tao Peng, Jinshou Yu and Huihe Shao; Huadong Huagong Xueyuan Xuebao/Journal of East China Institute of Chemical Technology vol. 17 No. 1, p. 99–104; Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5, p. 475–81, Fig. 3, Ref. 7, 1995. (Japan).

Abstract of "High–efficient application technology of DCS from the viewpoint of users," Oka Norihito (1); Narita Tsutomu (1); (1) Yamatake–Honeywell Co., Ltd.; Otomeshon, vol. 40, No. 2, p. 24–28, Fig. 5, Part 2, 1995. (Japan).

Abstract of Users' experience with software tools for process integration. General results; Stougie, L.; Roeterink, H.J.H.; Van Wijk, A.; Stikkelman, R.M.; Nov. 1996.

Abstract of "Integrated design and process technology. vol. 1;" Cooke, D.; Kraemer, B.J.; Sheu, P.C.Y.; Tsai, J.P.; Mittermeir, R.; Society for Design and Process Science, p. 51–57; 1996. (USA).

Abstract of "Integrated design and process technology. vol. 2;" Tanik, M.M.; Bastani, F.B.; Gibson, D.; Fielding, P.J.; Society for Design and Process Science, p. 423–430, 1996. (USA).

Abstract of "Integrated design and process technology. vol. 2" Tanik, M.M.; Bastani, F.B.; Gibson, D.; Fielding, P.J.; Society for Design and Process Science, p. 306–312, 1996.

Abstract of "Need low–cost networking consider DeviceNet," W. H. Moss; InTech vol. 43:11; p. 30–31, Nov. 1996.

"Plastic Car Bodies Pass the Crash Test," mechanical engineering; vol. 118, No. 12; Dec. 1996.

"Remote Integration and Control of Sensors via the Internet," Sensors and Systems; Peter L. Fuhr and Euan F. Mowat; University of Vermont; pp. 25–30; Dec., 1999.

LabVIEW Graphical Programming for Instrumentation, Networking Reference Manual, © Copyright 1993, 1994 National Instruments Corporation, Part No. 320587B–01, Sep. 1994.

LabVIEW Graphical Programming for Instrumentation, Tutorial for Windows, © Copyright 1993, 1994 National Instruments Corporation, Part No. 320593B–01, Sep. 1994.

LabVIEW Graphical Programming for Instrumentation, Data Acqusition VI Reference Manual for Windows, © Copyright 1992, 1994 National Instruments Corporation, Part No. 320536B–01, Sep. 1994.

"Ethernet Base Gateway Product," AEG–Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB–TCP Installation and Programming Manual," Niobrara Research and Development Corporation, Oct. 1, 1997.

"Internet Protocol, Darpa Internet Program, Protocol Specification—RFC:791," Defense Advanced Research Projects Agency, Sep. 1981.

"Transmission Control Protocol, Darpa Internet Program, Protocol Specification—RFC:793," Defense Advanced Research Projects Agency, Sep. 1981.

"Open MODBUS/TCP Specification," A. Swales, Sep. 3, 1997.

"[comp.unix.programmer] Unix–Socket–FAQ For Network Programming," Vic Metcalfe, Andrew Gierth and other contributors, Jan. 22, 1998.

"TCP/IP Illustrated, vol. 2, The Implementation," Gary R. Wright, W. Richard Stevens, 1997.

"Winsock 2 Information," Bob Quinn, 1995–1998 (last updated Dec. 5, 1998).

Website Information of PROFIBUS: Technical Overview.

Website Information of ODVA—The Open DeviceNet's Vendor Association.

Website of PROFIBUS International—Welcome Page.

Using World–Wide Web for Control Systems,, F. Momal, C. Pinto–Pereira, AT Division Cern, 1211 Geneva 23, http://mish231.cern.ch/Docs/ICALEPCS/1995/icalep95.htm.

When Technology Standards Become Counterproductive, Kenneth C. Crater, President, Control Technology Corporation, Hopkinton, MA dated Jul. 9, 1999, pp. 1–5.

A White Paper State Language for Machine Control, Kenneth C. Crater, President, Control Technology Corporation, Hopkinton, MA dated Jul. 9, 1999, pp. 1–11.

New PC–based Process Control & Data Acquistion Software Integrates Remote Internet Capabilities with Fast Pentium Support, Fred A. Putnam, LABTECH President, pp. 1–3.

Aug. 1996 Control Magazine—In The News—Electric Utility Industry Embarks on Automation Overhaul, pp. 1–10.

Jul. 1997 Control Magazine—Magazine Software Review—NT Package Give Plant Access Through the Web, pp. 1–3.

Oct. 1996 Control Magazine—Software Review—Article Archives, pp. 1–2.

ICS Instrumentation & Control Systems—Windows NT for real–time control: Which way to go?—ICS Magazine, pp. 1–8.

I&CS Jul. 1999—Special Report Software—Software: Open source OSs, objects, Web–based communications challenge status quo, (Wayne Labs, Senior Technical Editor), pp. 24–49.

Landis & Staefa MS 2000, pp. 1–2.

Landis & Staefa Standards and Open Protocols Integration System Architecture, p. 1.

Annabooks Bookstore, Programming and Interfacing the 8051, by Sencer Yeralan and Asutosh Ahluwalia, pp. 1–2.

SoftPLC Corporation—Java Support in SoftPLC Corp. Products, pp. 1–5.

Mach J. Company, MachJ, an enbeddable, clean room Java Virtual Machine, p. 1.

"Java and Programmable Automation Controllers," CiMax: Edition Terrain, No. 13 –May–Jun. 1997, copy in French and translated copy; Certificate of Accuracy of translation from Merrill Corporation, dated May 19, 2004.

* cited by examiner

INTERFACE TO A PROGRAMMABLE LOGIC CONTROLLER

RELATED APPLICATIONS

This application is related to a co-pending U.S. Patent Application entitled "Embedded File System for a Programmable Logic Controller," filed on Dec. 30, 1998, and having the same common assignee.

TECHNICAL FIELD

The present invention relates to industrial automation, and in particular to an interface for accessing, controlling and monitoring a programable logic controller.

BACKGROUND OF THE INVENTION

Sophisticated industrial processes require the cooperative execution of numerous interdependent tasks by many different pieces of equipment. The complexity of ensuring proper task sequencing and management requires not only procedural logic, but also constant monitoring of equipment states to organize and distribute operations and detect malfunctions.

Today, many industries use programmable logic controllers to properly operate and monitor elaborate industrial equipment and processes. Programmable logic controllers operate in accordance with a stored control program that causes the controller to examine the state of the controlled machinery by evaluating signals from one or more sensing devices (e.g., temperature or pressure sensors), and to operate the machinery (e.g., by energizing or de-energizing operative components) based on a procedural framework, the sensor signals and, if necessary, more complex processing.

Ordinarily, process operation is monitored, at least intermittently, by supervisory personnel by means of one or more central management stations. Each station samples the status of controllers (and their associated sensors) selected by the operator and presents the data in some meaningful format. The management station may or may not be located on the same site as the monitored equipment; frequently, one cental station has access to multiple sites (whether or not these perform related processes). Accordingly, communication linkage can be vital even in traditional industrial environment where process equipment is physically proximate, since at least some supervisory personnel may not be.

To facilitate the necessary communication, the controller and related computers (such as monitoring stations) are arranged as a computer network that uses some consistent protocol to communicate with one another. The communication protocol provides the mechanism by decomposing and routing messages to a destination computer identified by an address. The protocol may place a "header" of routing information on each component of a message that specifies source and destination addresses, and identifies the component to facilitate later reconstruction of the entire message by the destination computer. This approach to data transfer permits the network to rapidly and efficiently handle large communication volumes without reducing transfer speed in order to accommodate long individual message.

In typical computer networks having one or more programable logic controllers, a monitoring computer, which may be remotely located from any or all of the controllers to which it has access, periodically queries the controllers to obtain data descriptive of the controlled process or machine, or the controller itself. This data is then available for analysis by the monitoring computer.

Today, the programs to access, control, and monitor programable logic controllers are written in programing languages that are not easily customizable by a user.

SUMMARY OF THE INVENTION

The present invention provides an interface for accessing, controlling and monitoring a programable logic controller with a network client having a conventional web browser.

The present invention includes an archive, an interface, and a library. The archive provides for compiling an application written in code supported by the web browser. The interface is responsive to the application for establishing a connection between the controller and the network client. Further, the library is responsive to the application for supporting communication between the controller and the network client upon establishing a connection therebetween.

DETAILED DESCRIPTION

Figure 1:
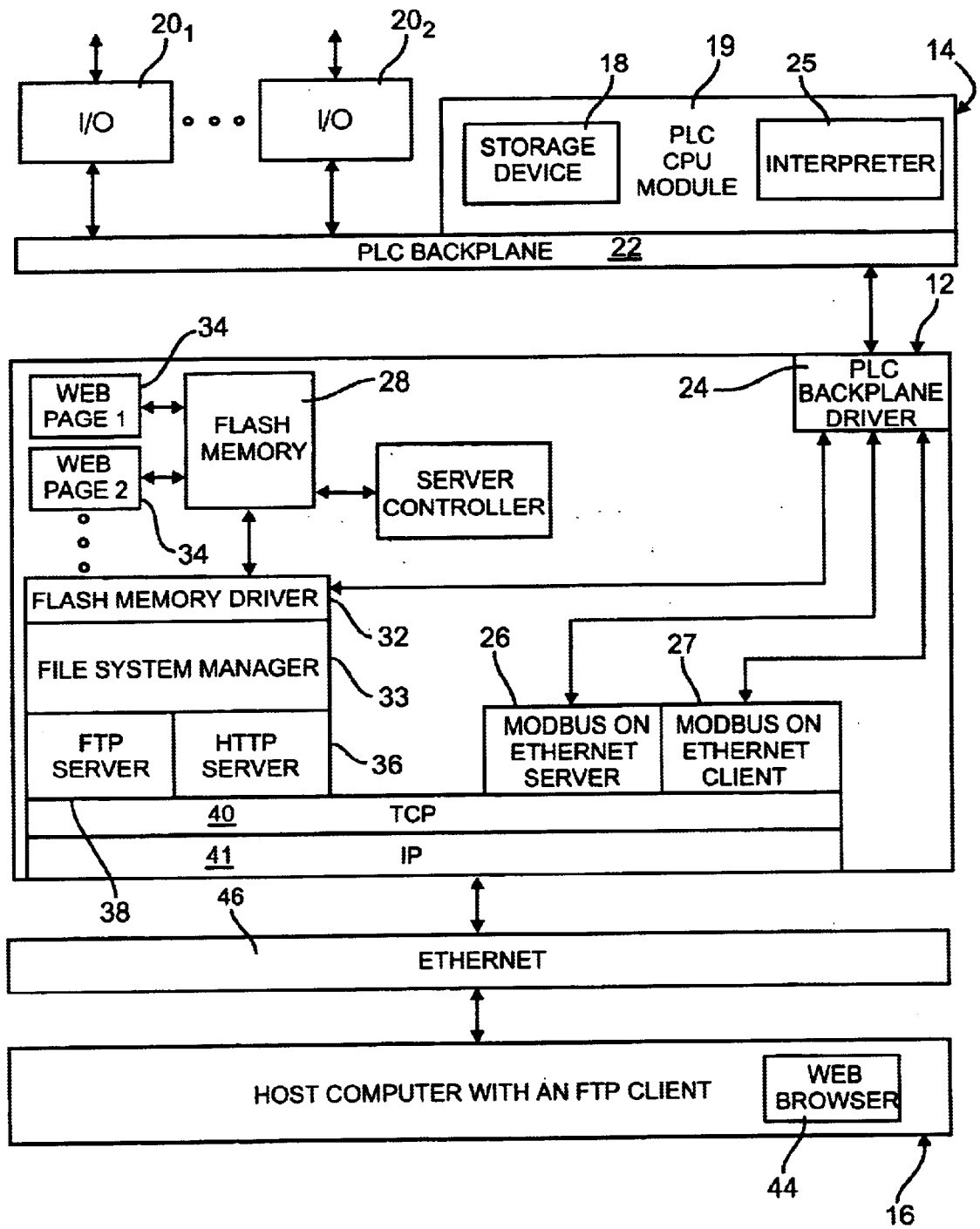
FIG. 1 is a simplified block diagram of a server operably connected between a programable logic controller and a host computer.

The Internet is a worldwide "network of networks" that links millions of computers through tens of thousands of separate (but interconnecting) networks. Via the Internet, users can access tremendous amounts of stored information and establish communication linkages to other Internet-based computers.

Much of the Internet is based on the client-server model of information exchange. This computer architecture, developed specifically to accommodate the "distributed computing" environment characterizing the Internet and its component networks, contemplates a server that services requests of other computers or clients that connect to it. The clients usually communicate with a single server or can use the server to reach other servers.

To ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across telephone lines.

The Internet supports a large variety of information-transfer protocols such as the World Wide Web (hereinafter, simply, the "web"). Web-accessible information is identified by a uniform resource locator or "URL," which specifies the location of the file in terms of a specific computer and a location on that computer. Any Internet "node"—that is, a computer with an IP address (e.g., a server permanently and continuously connected to the Internet, or a client that has connected to a server and received a temporary IP address)—can access the file by invoking the proper communication protocol and specifying the URL. Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

An important feature of the web is the ability to connect one document to many other documents using "hypertext" links. A link appears unobtrusively as an underlined portion of text in a document; when the viewer of this document moves the cursor over the underlined text and clicks, the link—which is otherwise invisible to the user—is executed and the linked document retrieved. That document need not be located on the same server as the original document.

Hypertext and searching functionality on the web is typically implemented on the client machine, using a computer program called a "web browser." With the client connected as an Internet node, the browser utilizes URLs—provided either by the user or the link—to locate, fetch and display the specified documents. "Display" in this sense can range from simple pictorial and textual rending to realtime playing of audio and/or video segments or alarms, mechanical indications, printing, or storage of data for subsequent display. The browser passes the URL to a protocol handler on the associated server, which then retrieves the information and sends it to the browser for display; the browser causes the information to be cached (usually on a hard disk) on the client machine. The web page itself contains information specifying the specific Internet transfer routine necessary to retrieve the document from the server on which it is resident. Thus, clients at various locations can view web pages by downloading replicas of the web pages, via browsers, from servers on which these web pages are stored. Browsers also allow users to download and store the displayed date locally on the client machine.

Most web pages are written in HyperText Markup Language, or HTML, which breaks the document into syntactic portions (such as headings, paragraphs, lists, etc.) that specify layout and contents. An HTML file can contain elements such as text, graphics, tables and buttons, each identified by a "tag." Markup languages, however, produce static web pages.

However, if desired, web-page designers can overcome the static page appearance dictated by HTML. The Java language is a well-known, machine-independent, interpreted computer language that facilitates dynamic display of information. Java-encoded "applets" are stand-alone programs embedded within web pages that can interact with the user locally, display moving animations and perform other functions on "Java-capable" browsers—that is, browsers which include a Java interpreter. The applet is transferred to the browser along with other web-page information and is executed by the Java interpreter; the data acted upon by the applet can be located on the same or a different web page, or a different server entirely, since applets can themselves cause the browser to retrieve information via hypertext links.

For example, suppose that a client users instructs the client-resident browser to obtain a document having the URL http://host/file.html. The browser contacts the HTTP server running on "host," and requests the document file-.html. The server finds this document and sends it according to the proper Internet protocol, along with a Multipurpose Internet Mail Extension or "MIME" identifier that specifies the document's type. When the client receives the document, the browser examines the MIME to determine whether it is capable of autonomously displaying the document, or whether an external resource (e.g., a specialized viewer to display video segments) is necessary. In a simple case, the document might contain text and graphics specified in HTML, and specify and image residing in a different file on a different server or on the same server. The browser renders the document in accordance with the HTML instructions and requests the image, displaying it in the document as specified by the instructions when the image arrives. In more complex cases the document may contain, for example, Java instructions, which are passed to the browser's Java interpreter.

Key to the concept of a web page, therefore, is the division of functionality between the client-based browser and the server-based web page, and the particular roles assigned to each. The browser locates, fetches and displays resources, executes hyperlinks and applets, and generally interprets web-page information; the web page contains data, hyperlink addresses, transfer protocols and computer instructions defining "potential functionality" that may be executed by the browser. Ordinarily, web pages reside on servers accessible via the Internet. However, the above-discussed mode of splitting functions between web pages and browsers can be instituted on internal networks as well. These networks, sometimes called "intranets," support the TCP/IP communication protocol and typically serve the needs of a single business (of business department), which may be located at a single site (with individual clients connected by a simple local-area network) or multiple physically dispersed sites requiring a wide-area network. Various of the computers forming the intranet network can be utilized as servers for web pages, each with its own URL and offering access to network client computers via TCP/IP.

A server 12 operably connected between a programable logic controller 14.and a host computer 16 is depicted in FIG. 1. The server 12 provides web access to controller data (i.e., variable, system diagnostics, configuration information, I/O status) through "thin clients" (i.e., web browsers). The server 12 provides meaningful, structured information to users via the open communication standard to TCP/IP and HTTP. In particular, anyone with a web browser can browse the controller as if it was just another web site.

Examples of other web interfaces to a programmable controller are disclosed in . U.S. application Ser. No. 08/927, 005, filed on Sep. 10, 1997, now U.S. Pat. No. 6,282,454, which is incorporated herein by reference.

In FIG. 1, the programable logic controller 14 is conventional and includes one or more storage devices indicated generally at 18. The controller 14 includes a CPU module 19 for executing program instructions retrieved from storage 18 to operate, for example, a piece of industrial equipment. The storage device 18 typically is composed of a combination of volatile RAM for temporary storage and processing, and non-volatile, programming read-only memory ("PROM") that contains permanent aspects of the controller's operating instructions. The controller 14 also includes a series of input/output modules shown representatively at 201, 202 that sense the condition of, and send control signals to, the controlled machine (not shown) over a communication link (indicated by arrows). This communication link facilitates the bidirectional exchange of signals between each I/O module 20 and an associated device (e.g., a sensor or an actuator).

The controller 14 includes an internal bus provided by a backplane 22. The internal bus provides for operably connecting the modules of the programable logic controller 14 to each other via a local-area network. The communication of the modules over the internal bus can be accomplished by using a specific protocol such as, for example, the MODBUS Application Protocol by Schneider Automation, Inc.

The programable logic controller 14, and in particular the CPU module 19, provides for operating the I/O modules 20. The programable logic controller 14, via the I/O modules 20, examines the condition of selected sensing devices associated with the controlled equipment, and, based thereon, sends appropriate operative control signals to the equipment.

The instructions (i.e., symbols) for operation of the controller 14 are written in a relatively high-level language that can be stored in block 18 for permitting not only manipulation of input and output data, but also arithmetic and timing functions, file-handling capabilities and other complex tasks. These instructions are translated into machine-readable code by the controller via an interpreter 25. For example, one standardized type of instruction symbolically represents control functions according to a relay ladder diagram; it may be desired, however, to utilize state-control languages that represent controller actions in terms of steps, each of which consists of a command that creates actions and one or more instructions for leaving the step.

Server 12 is operably connected to the backplane 22 of the programable logic controller 14 via a backplane driver 24. The server 12 allows Internet/Intranet access to information stored in the programable logic controller 12 including controller data, I/O diagnostics, configuration information through a "thin client" (i.e., web browsers). The server 12 is substantially "plug-and-play" wherein most of the server system is transparent to the user (web browser) and does not have a user interface in the traditional sense.

In particular, the server 12 allows Internet/Intranet access to controller and network information by having a HTTP sever 36 and a File Transfer Protocol (FTP) server 38 within the module 12. These servers provide a set of HTML pages that allow the user to display controller configuration, controller status, I/O module configuration, I/O module status, to view and modify register values and display the Ethernet statistics. The user is also allowed to customize Web pages and download them into the server.

The use of the web along with allowing for uploading customizable HMTL pages provides a low-cost ethernet connection Web Browser view to programable logic controller data and diagnostics.

As stated previously, the MODBUS protocol is preferably used to communicate between the server 12 and the controller 14. In addition, the server 12 communicates with the host 16 over an Ethernet network 46. Accordingly, the server 12 provides both a MODBUS on Ethernet Server 26 and a MODBUS on Ethernet Client 27 for providing communications between the controller 14 and the host 16.

The server 12 also includes a flash memory 28 operably connected via a flash memory driver 32 to both the controller backplane driver 24 and a file system manager 33. Stored within the flash memory 28 are variable/symbol information that can be downloaded to the programable logic controller 14 for execution. The variable/symbol information is loaded into the memory via the FTP server 38 from a database or the like. The use of the FTP server 38 provides for the efficient transfer of variable/symbol information along with other program files into the memory 28.

The flash memory 28 also provides storage for supporting the HTTP server 36, the FTP server 38, and operation of TCP/IP. Moreover, the flash memory 28 stores JAVA applets and data structures defining one or more web pages shown representatively at $34_1$, $34_2$. The web pages 34 consists of ASCII data obtained from one or more of I/O modules 20, HTML formatting instructions and associated data, and/or "applet" instructions (i.e., JAVA code) for causing a properly equipped remote computer to display the data in a dynamic fashion.

In particular, to implement reading information from the controller 14 and displaying it in HTML pages, much of this information handling is done by the JAVA applets running on the browser of the host 16. Preferably, the applets make data requests of the controller 14 with ModBus commands over TCP/IP.

Management and transmission of web pages 40 to a querying computer is handled by the File System Manager 33 an the HTTP server 36 for allowing module 12 to function as a network server. The host or client 16 connects to the server 12 using the IP address of the HTTP server 36 assigned by the network administrator. The HTTP server 36 downloads HTML documents to the user's web browser from the flash memory 28 such as, for example, the "home page" of the server 12. If desired, the server 12, via the "home page," can prompt the user for a predefined password to allow access to additional web pages with "read-only" permission and another password to allow "read-write" permission. Thus, if the user is knowledgeable in HTML, the appearance of the home page can be customized by downloading another "home page" into the flash memory 28.

As such, HTTP is the primary protocol used to communicate between the host computer 16 and the server 12. The HTTP server 36, commonly called a web server, is the "active component" of the server 12 that listens on a designated TCP/IP port for HTTP requests from web browsers. When a request for a Web page (HTML document) is sent to the HTTP server 36, the server retrieves, or dynamically creates, the appropriate page from the flash memory 28, via the file system manager 30, and transmits it to the browser using HTTP.

As previously indicated, FTP is another protocol used to communicate between a client and the server 12 which is handled primarily by block 38. The FTP server 38 is the "active component" of the module 12 that listens on a designated TCP/IP port for requests for programs stored within the flash memory 28. Furthermore, the FTP server 38 provides for uploading programs and web pages into the flash memory 28.

Incoming data from I/O modules 20 can be, if desired, processed by the programable logic controller 14 before being copied to one of the web pages 34 within the server 12. Because of the linking capabilities of the web, it is not necessary for the data to be stored in the web page containing the display instructions; instead, the latter page may contain a "hyperlink" pointer to a different web page in which data is accumulated. In addition, a web page can obtain data from other web pages (e.g., from different controllers) by accessing those web pages when appropriate. For example, if a cluster of controllers are operationally related such that data from one is usefully combined with data from the others, each page of the cluster can contain instruction to access the other pages (or their associated data pages) when accessed by a user, and the applet configured to present data from the entire cluster. Alternatively, the applet can be configured to cause the client's browser to access the web page. As used herein, data is "associated with" a web page or an applet if it is stored as part of the web page or applet, or stored in a directly or indirectly hyperlinked web page.

Network communication blocks 40 and 41 provide for operating and connecting the sever module 12 to a host or client computer 16 over a local-area network. Accordingly, communication blocks 40 and 41 include data-transmission circuitry to transfer streams of digitally encoded data over telephone or other communication lines.

In an embodiment, computer 16 can function as a network client and consists of a Personal Computer (PC) running a WINDOWS based graphical user interface supplied by Microsoft Corporation. Computer 16 also includes a network interface for facilitating connection to and data transfer through the computer network 46 which can be a local network, the Internet, or an Internet-linked local network. Naturally, computer 16 also contains various conventional components, i.e., a display, a storage system, an operating system and a graphical user interface, and a keyboard and/or position-sensing device (e.g., a mouse) for accepting input from the user. For convenience of presentation, these are not shown.

Also loaded onto the computer 16 is a web browser 44 that supports JAVA, such as INTERNET EXPLORER (supplied by Microsoft Corp.) or NETSCAPE NAVIGATOR (supplied by America On Line) and communicates with the server 12, which in turn communicates with the programable logic controller 14. Preferably, the host computer 16 and the server 12 communicate with each other via an Ethernet TCP/IP network 46.

In particular, the web pages 34 within the flash memory 28 enable a user of the host computer 16 to view certain information about the controller 14 without a custom client application. For instance, if the host computer 16 includes a standard web browser 44 and access to the server 12, then a user of the host can view the contents of the controller 14 connected to the server by downloading a page 30 stored within the flash memory 28.

In another example, the host computer 16, via the web browser 44, sends requests to the server 12 to view a set of controller registers within the controller CPU module. The server 12 then queries the controller 14 via the MODBUS on Ethernet Client for the requested information. The controller 14 responds to the query by sending the requested data to the sever 12. Finally, via the MODBUS on Ethernet Server 26, the sever 12 sends this information back to the web browser client 16 that requested it.

As indicated above, the web pages 34 within the flash memory 28 allow a user of the web browser 44 to "browse" the contents of a programable logic controller 12 as if it was just another web site. After the web page has been downloaded to the host 14, users can use their web browser to connect to the programable logic controller and view controller information such as its status, I/O health, configuration information, and runtime values of variables and registers.

Preferably, an Application Programming Interface (API) is provided for writing applets or applications, preferably in JAVA (Trademark of Sun Microsystems, Inc., Mountain View, Calif.), that communicate with the controller 14 via Ethernet TCP/IP. The application programming interface includes several classes for writing applets and applications and an archive containing all the class files needed to compile an applet or application written by a user. Preferably, the archive is not platform dependent so compiling applets for different types of controllers (i.e., controller executing various control programs) is supported.

A desirable feature of JAVA is that applet security restrictions permit an applet to connect only to the host from which is was downloaded. Accordingly, when developing an applet for downloading to a server or controller, it is necessary that the classes comprising the applet be put in an archive file and downloaded to the server or controller. Moreover, an HTML file (i.e., web page) that contains an <APPLET>tag for the applet should also be downloaded. Accordingly, a web browser can than be used to load the web page from the server or controller and view the applet.

Figure 2:
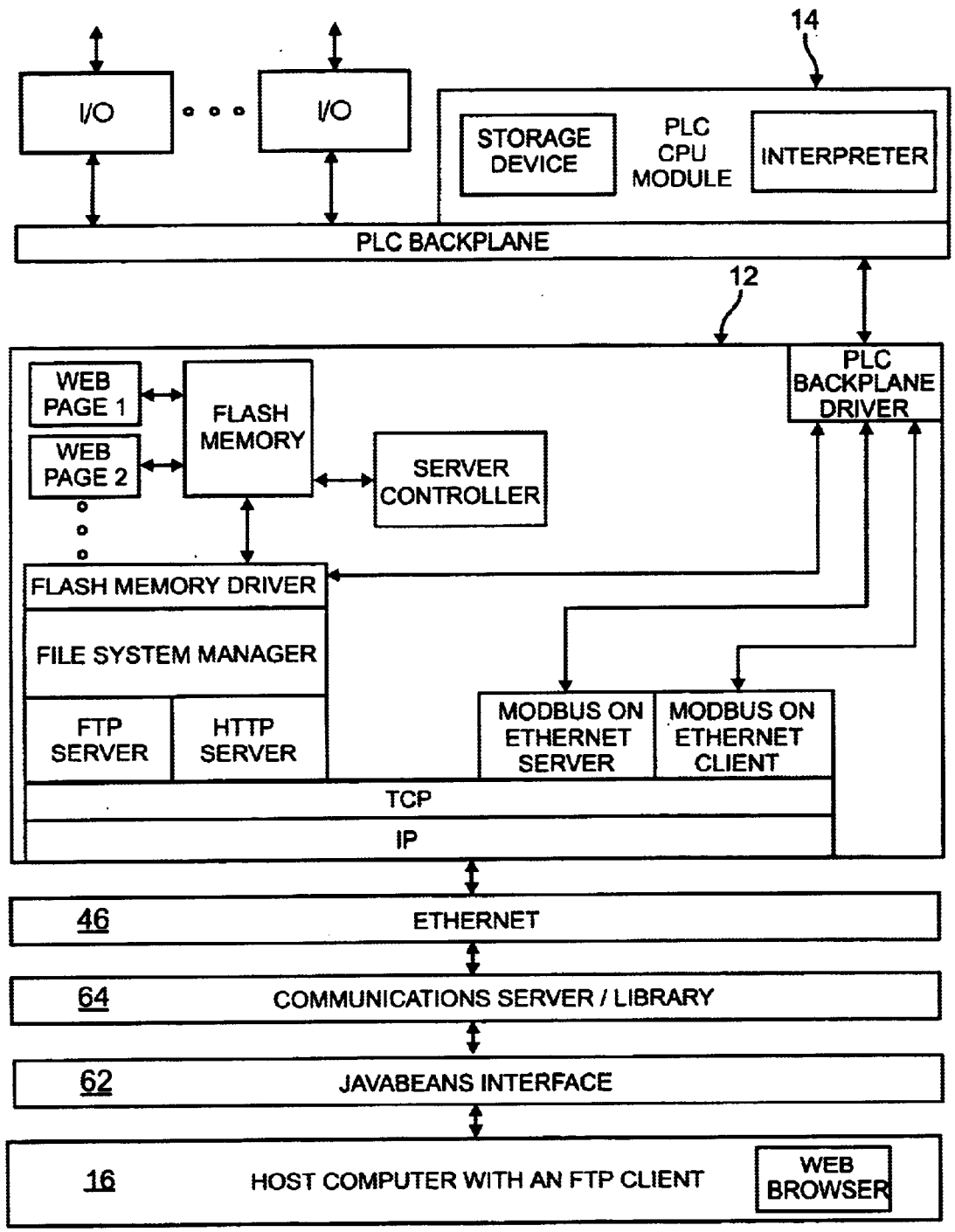
FIG. 2 is a simplified block diagram of an interface in accordance with the present invention having a communications library and operably connected between the server and the host computer of FIG. 1.

In an embodiment, as shown in FIG. 2, the application programming interface 60 includes a communications interface 62 and a communications library 64 for allowing a developer, preferably using JAVA, to easily communicate with a controller using TCP/IP. The communications interface 62 is preferably a conventional JAVABEAN interface operably connected between the communication client 16 and the controller 14. Accordingly, all of the classes within the communications interface 62 are preferably implemented as JAVABEANS. The Beans can be connected by use of a Bean Box or by writing Java code to connect them directly. The methods of the classes provided by the JAVABEAN interface 62 are preferably the only ones normally needed by a client programmer to use all of the functions available from the communications library 64.

The communication library 64 is operably connected between the communications interface 62 and the programable logic controller 14. The communications library 64 provides support for communicating with the programable logic controller 14 and accessing information about variables in a program being executed by the controller. This allows the communications library 64 to provide on-demand reading and writing of a variable's values, as well as continuous monitoring of its value and reporting to the client 16 any changes in the value.

The primary interface for the communications library 64 is a set of JavaBeans. These Beans can be generally categorized into a communication bean, a family of get and set beans, and a family of monitor beans. The communication bean is the main Bean that an applet or application instantiate in order to establish a connection to the controller 14. The family of get and set Beans gets and sets the run-time values of variables, or register/memory addresses, of a controller's program 'on-demand.' Furthermore, the monitor family of Beans continuously monitors the run-time value of variables or register/memory addresses, of a controller's program and notifies the client when the values change.

Figure 3:
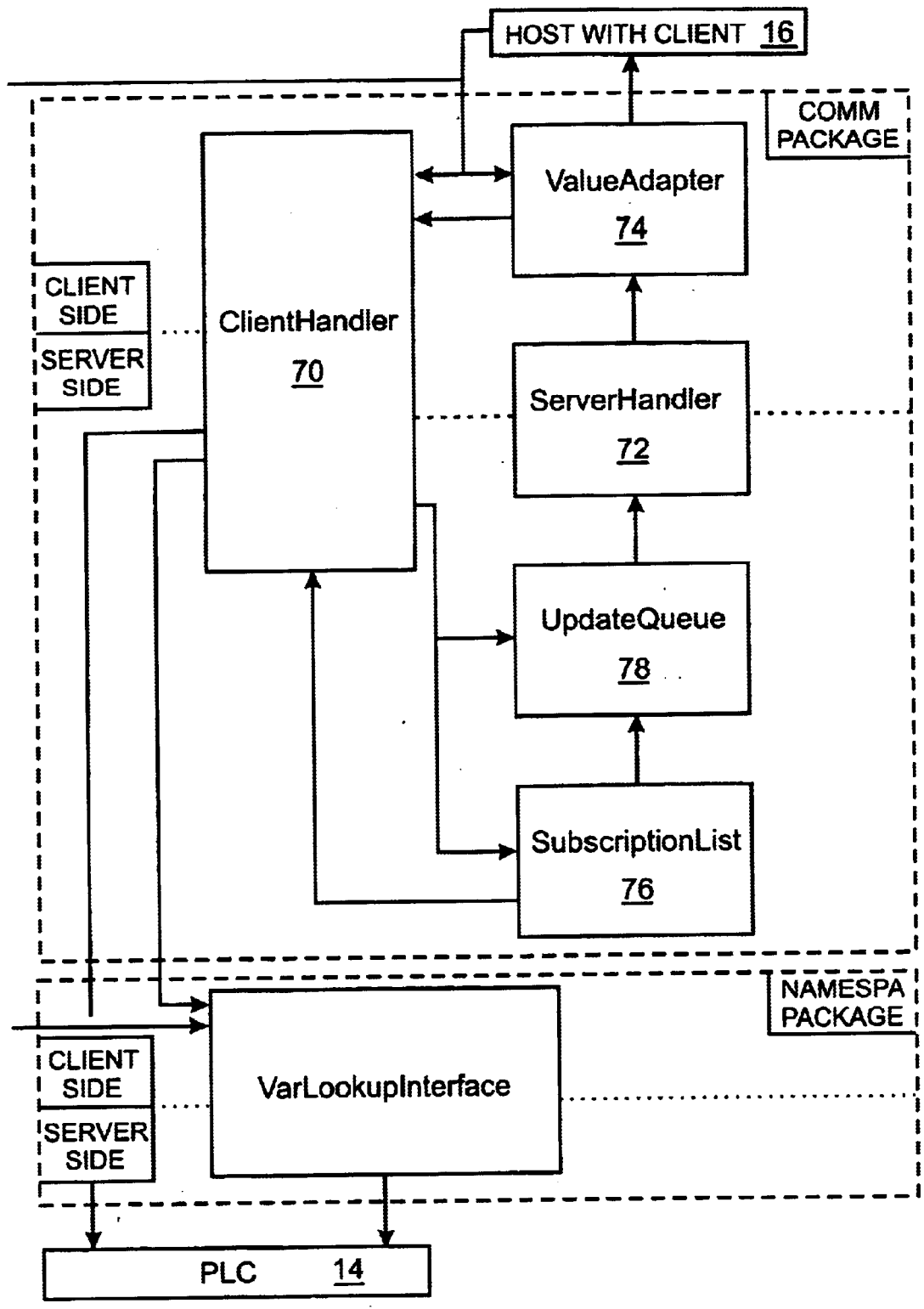
FIG. 3 is a simplified block diagram of the communications library of FIG. 2.

The organization of the classes within the communications library 64 is shown in FIG. 3. The communications library 64 includes a communications package 66 and a namespace package 68. The communications package 66 includes elements comprising a client handler 70, a server handler 72, a value adapter 74, a subscription list 76, and an update queue 78.

The client handler 70 is operably attached to the communication client 16 and maintains the interface with the client by receiving instructions and then, based on the instructions, providing appropriate responsive input signals to elements within the communications package 66 and the namespace package 68 .

The server handler 72 is operably attached to the value adaptor 74 and the update queue 78. The server handler 72 provides for unsolicited data updates by receiving data update notifications from the programable logic controller 14 and then forwarding this information to the value adapter 74.

The value adapter 74 is operably attached to the server handler 72, the client handler 70, and the communication client 16. The value adapter 74 dispatches messages for unsolicited data updates to the client 16. In particular, the value adapter 74 receives messages from the server handler 72 and then forwards the notification.

The subscription list 76 is operably attached to the update queue 78 and the client handler 70. The subscription list 76 handles the polling of the programable logic controller 12 for those data items that the communication client 14 has requested event notification when the data item's values changes.

The update queue 78 is operably attached to the server handler 72, subscription list 76, and the client handler 70. The update queue 78 handles the dispatching of the event notifications that are sent by the subscription list 76. When an event notification is sent to the update queue 78, it is placed in a first-in-first-out queue. Accordingly, the update queue 78 provides for a buffering of the update events that are sent by the subscription list 76. In this way the rate at which the programable logic controller 14 can be polled is decoupled from the rate at which the display (not shown) can be updated on the client 16.

The namespace package 68 includes an element comprising a variable lookup adaptor 80 operably attached to the client 16, the client handler 70, and the programable logic controller 14. The variable lookup adaptor 80 executes instructions from the client handler 70 for obtaining information about variables contained in programs executed by controller 14.

Within FIG. 3, elements within the communication package 66 and the namespace package 68 are indicated as residing on the client side, server side, or on both. The client side within FIG. 3 indicates those elements that are executed by the user's web browser. Further, the server side indicates those elements that are executed by a server or, if a server is not used in communicating with the controller 14, the user's web browser.

In an embodiment, the interface includes several packages that are indexed, for example, to include: com.package.dt; com.package.main; com.package.main.comm; com.package.namespace; and com.package.vars.

Package com.package.dt includes classes com.package.dt.DT and com.package.dt.FT. Preferably, class com.package.dt.DT has a public class DT and extends Object. In particular, the DT class defines the platform-independent data types for PLC references. The variables for class com.package.dt.DT include: BCD16—Unsupported data type (provided for mapping of different PLC data types if needed); BCD32—Unsupported data type (provided for mapping of different PLC data types if needed); BCD64—Unsupported data type (provided for mapping of different PLC data types if needed); BCD8—Unsupported data type (provided for mapping of different PLC data types if needed); BOOL—DT value for the boolean data type; DATE—Unsupported data type (provided for mapping of different PLC data types if needed); DINT—DT value for the double integer data type; DT—Unsupported data type (provided solely for mapping of different PLC data types if needed); INT—DT value for the integer data type; LONG—Unsupported data type (provided for mapping of different PLC data types if needed); LREAL—Unsupported data type (provided for mapping of different PLC data types if needed); REAL—DT value for the floating point data type; SHORT—DT value for the short data type; STR—DT value for the string data type; TIME—DT value for the time data type; TOD—Unsupported data type (provided for mapping of different PLC data types if needed); typeNames—Array of names for the supported data types; UDINT—DT value for the unsigned double integer data type; UINT—DT value for the unsigned integer data type; ULONG—Unsupported data type (provided for mapping of different PLC data types if needed); UNDEFINED—DT value for the undefined/unknown data type; and USHORT—DT value for the unsigned short data type.

In this embodiment, the constructor for class com.package.dt.DT is "DT( )" and the methods are: getSize(short) for returning the size (in bytes) of a specified data type; toDT (String) for returning the data type (DT value) for a specified data type name; and toName(short) for returning the identifying text string (name) for a specified data type.

Class com.package.dt.FT has a public class FT and extends Object. Preferably, the variables for class com.package.dt.FT include: ASCII, BIN, BOOL, DEC, HEX, N_FMTS, NOFMT, REAL, and TIME. In this embodiment, the constructor for class com.package.dt.FT is "FT( )" and the methods are: formatValue(Number, int, short) and parseValue(String, int, short).

Package com.package.main.comm includes the class com.package.main.comm.StatusMessages having a public class StatusMessages and extending Object. In this embodiment, the constructor for class com.package.main.comm is "StatusMessages( )" and the methods are: get(int), get(Number), and init(Locale).

Package com.package.main includes classes: com.package.main.CommBean; com.package.main.CommBeanVarLookup; com.package.main.ConnectPLC; com.package.main.GetBits; com.package.main.GetBool; com.package.main.GetDInt; com.package.main.GetInt; com.package.main.GetNumber; com.package.main.GetReal; com.package.main.GetRef; com.package.main.GetShort; com.package.main.GetString; com.package.main.GetUDInt; com.package.main.GetUInt; com.package.main.GetUShort; com.package.main.LiveLabelApplet; com.package.main.LiveLabelMgrApplet; com.package.main.MonitorAdapter; com.package.main.MonitorBits; com.package.main.MonitorBool; com.package.main.MonitorDInt; com.package.main.MonitorInt; com.package.main.MonitorNumber; com.package.main.MonitorReal; com.package.main.MonitorRef; com.package.main.MonitorShort; com.package.main.MonitorString; com.package.main.MonitorUDInt; com.package.main.MonitorUInt; com.package.main.MonitorUShort; com.package.main.ReadRef; com.package.main.Ref; com.package.main.ServerChangeEvent; com.package.main.ServerChangeListener; com.package.main.SetBits; com.package.main.SetBool; com.package.main.SetDInt; com.package.main.SetInt; com.package.main.SetNumber; com.package.main.SetReal; com.package.main.SetRef; com.package.main.SetShort; com.package.main.SetString; com.package.main.SetUDInt; com.package.main.SetUInt; and com.package.main.SetUShort.

Class com.package.main.CommBean has a public class CommBean, extends Object, and implements Serializable. In particular, this class preferably is the support class for all Main Beans. Every Main Bean must be provided a reference to this class either by becoming a ServerChangeListener (if using a Bean Box) or via the Bean's constructor (if using Java code to connect the Beans).

In this embodiment, the constructor for class com.package.main.CommnBean is "CommBean( )", as a default constructor, and "CommBean(Locale)" as a constructor to set a locale for status and exception messages. Moreover, the methods are: addPropertyChangeListener (PropertyChangeListener) for adding a property change listener; addServerChangeListener(ServerChangeListener) for adding a 'server change' listener; connect(String, boolean) for creating a connection to a PLC; disconnects for disconnecting the connection with a PLC; getadaptor( ) for returning reference to the current 'value adapter'; getServer( ) for returning reference to the current 'comm server'; getVarLookup( ) for returning reference to the current 'namespace server'; isConnected( ) for determining if connection to PLC has been established; isStarted( ) for determining if registered data items have been subscribed; isSuspended( ) for determining if processing of subscription list has been suspended; removePropertyChangeListener (PropertyChangeListener) for removing a property change listener; removeServerChangeListener (ServerChangeListener) for removes a 'server change listener; resume( ) for resuming processing of the subscription list; start( ) for subscribing (starting) all registered data items; stop( ) for unsubscribing (stoping) all registered data items; and suspend( ) for suspending processing of the subscription list.

Class com.package.main.CommBeanVarLookup has a public class of "CommBeanVarLookup", extends Object, and implements VarLookupInterface. In particular, the CommBeanVarLookup class is used to access the variables of PLC databases that have been loaded from a Symbol Table (namespace) file stored on the PLC.

In this embodiment, the constructor for class com.package.main.CommBeanVarLookup is "CommBeanVarLookup( )", as a default constructor, and "CommBeanVarLookup(Locale)" as a constructor to set a locale. Moreover, the methods are: get(String) for returning the attributes of a specified variable (symbol); getSymbolCount( ) for returning the number of symbols (variables) that were loaded from the Symbol Table (name space); getsymbols( ) for returning the list of symbols (variables) that were loaded from the Symbol Table (name space); getVerInfo( ) for returning the version of the PLC database that was used to create the Symbol Table (namespace) file that is in the connected PLC; init (InetAddress) for causing the Symbol Table (name space) to be loaded from the specified host; isReadOnly(String, int) for determining if register reference (direct address) has been designated as read-only.

Class com.package.main.ConnectPLC has a public class of "ConnectPLC", extends Object, and implements ServerChangeListener, PropertyChangeListener, Serializable. In particular, the ConnectPLC class is a Bean that is used to specify the PLC to connect to. This class is intended for use in a Bean Box only. (For connecting to a PLC via direct Java code, use the connect( ) method of class CommBean.)

In this embodiment, the constructor for class com.package.main.ConnectPLC is "ConnectPLC" and the methods are: addPropertyChangeListener(PropertyChangeListener) for adding a property change listener; connect( ) for creating connection to the PLC; disconnect( ) for disconnecting the connection with the PLC; getPLC( ) for returning name of PLC that is to be connected; isconnected( ) for determines if connection to PLC has been established; isLoadSymbols( ) for determining if Symbol Table (namespace) is to loaded upon connection; isStarted( ) for determining if registered data items have been subscribed; isSuspended( ) for determines if processing of subscription list has been suspended; propertyChange(PropertyChangeEvent) which is invoked when a bound property (of CommBean) is changed; -removePropertyChangeListener(PropertyChangeListener) for removes a property change listener; resume( ) for resuming processing of the subscription list; serverChanged (ServerChangeEvent) which is invoked when the comm server changes; setLoadSymbols(boolean) for setting flag that will cause Symbol Table to be loaded; setPLC(String) for setting name of PLC that is to be connected; start( ) for subscribing (starting) all registered data items; stop( ) for unsubscribing (stoping) all registered data items; suspend( ) for suspending processing of the subscription list.

Class com.package.main.GetBits has a public class of "GetBits", extends GetRef, and implements Serializable. In particular, the GetBits class is a Bean that is used to read a variable or register(s) reference on demand. The retrieved value is available as a Java BitSet. The size of the resultant BitSet is determined by multiplying the quantity of references times the size (in bits) of each reference. The size of each allowed data type is: BOOL 1 bit SHORT 8 bits USHORT 8 bits INT 16 bits UINT 16 bits DINT 32 bits UDINT 32 bits If the address specified for the data item is a variable name, the quantity of references is one (the default). Also, for all variable references, it is not necessary to set the data type of the reference. (A variable's data type is looked-up as part of processing the read request.) If, however, the data type of a variable reference is explicitly set, then it matches exactly the actual data type of the variable.

In this embodiment, the constructor for class com.package.main.GetBits is "GetBits", as the default constructor, and "GetBits(ClientHandlerInterface) as the constructor to set the 'comm server' to be used for processing requests. Moreover, the preferred methods are: getValue( ) for returning the retrieved value; getValueAsString( ) for returning the retrieved value; and setDatatype(short) for setting the data type of the reference that is to be read from PLC.

Class com.package.main.GetBool has a public class of "GetBool", extends GetRef, and implements Serializable. In particular, the GetBool class is a Bean that is used to read a variable or discrete(s) reference 'on demand'. If the address specified for the data item is a variable name, the quantity of references is one (the default), and the variable's data type is BOOL.

In this embodiment, the constructor for class com.package.main.GetBool is "GetBool( )", as the default constructor, and "GetBool(ClientHandlerInterface) as the constructor to set the comm server to be used for processing requests. Moreover, the preferred methods are: getValue( ) for returning the retrieved value; getValues( ) for returning the retrieved value(s); and getvalues(int) for returning a specific element of the array of retrieved values.

Class com.package.main.GetDInt has a public class of "GetDInt", extends GetRef, and implements Serializable. In particular, the GetDInt class is a Bean that is used to read a variable or register(s) reference on demand. Each reference is treated as a signed, 32-bit integer. If the address specified for the data item is a variable name, the quantity of references is one (the default), and the variable's data type is DINT.

In this embodiment, the constructor for class com.package.main.GetDInt is "GetDInt( )", as the default constructor, and "GetDInt(ClientHandlerInterface)" as the constructor to set the 'comm server' to be used for processing requests. In addition, the preferred methods are: getValue( ) for returning the retrieved value; getValues( ) for returning the retrieved value(s); and getvalues(int) for returning a specific element of the array of retrieved values.

Class com.package.main.GetInt has a public class of "GetInt", extends GetRef, and implements Serializable. In particular, the GetInt class is a Bean that is used to read a variable or register(s) reference 'on demand'. Each reference is treated as a signed, 16-bit integer. If the address specified for the data item is a variable name, the quantity of references is one (the default), and the variable's data type is INT.

In this embodiment, the constructor for class com.package.main.GetInt is "GetInt( )", as the default constructor, and "GetInt(ClientHandlerInterface)" as the constructor to set the "comm server" to be used for processing requests. Moreover, the preferred methods are: getValue( ) for returning the retrieved value; getvalues( ) for returning the retrieved value(s); and getvalues(int) for returning a specific element of the array of retrieved values.

Class com.package.main.GetNumber has a public class of "GetNumber", extends GetRef, and implements Serializable. In particular, the GetNumber class is a Bean that is used to read a variable or register(s) reference 'on demand'. The data type of the reference(s) is a settable property. If the address specified for the data item is a variable name, the quantity of references is one (the default). Also, for all variable references, it is not necessary to set the data type of the reference. (A variable's data type is looked-up as part of processing the read request.) If, however, the data type of a variable reference is explicitly set, then it should match the actual data type of the variable.

In this embodiment, the constructor for class com.package.main.GetNumber is "GetNumber( )", as the default constructor, and "GetNumber(ClientHandlerInterface)" as the constructor to set the "comm server" to be used for processing requests. Moreover, the preferred methods are: getValue( ) for returning the retrieved value; getValues( ) for returning the retrieved value(s); getvalues(int) for returning a specific element of the array of retrieved values; and getDatatype(short) for setting the data type of the reference that is to be read from the PLC.

Class com.package.main.GetReal has a public class of "GetReal", extends GetRef, and implements Serializable. In particular, the GetReal class is a Bean that is used to read a variable or register(s) reference on demand. Each reference is treated as a 32-bit IEEE floating point number. If the address specified for the data item is a variable name, the quantity of references is one (the default), and the variable's data type is REAL.

In this embodiment, the constructor for class com.package.main.GetReal is "GetReal( )", as the default constructor, and "GetReal(ClientHandlerInterface)" as the constructor to set the "comm server" to be used for processing requests. Moreover, the preferred methods are: getValue( ) for returning the retrieved value; getValues( ) for returning the retrieved value(s); and getvalues(int) for returning a specific element of the array of retrieved values.

Class com.package.main.GetRef has a public class of "GetRef", extends ReadRef, and implements ServerChangeListener and Serializable. In particular, the GetRef class is the common base class for all the Get Beans. The methods of this class are: doAction( ) for initiating the reading of values from the PLC; readvalues( ) for initiating the reading of values from the PLC; and serverChanged (ServerChangeEvent) for invoking when the comm server changes.

Class com.package.main.GetShort has a public class of "GetShort", extends GetRef, and implements Serializable. In particular, the GetShort class is a Bean that is used to read a variable or register(s) reference on demand. Each reference is treated as a signed, 8-bit integer. If the address specified for the data item is a variable name, the quantity of references is one (the default), and the variable's data type is SHORT.

In this embodiment, the constructor for class com.package.main.GetShort is "GetShort( )", as the default constructor, and "GetShort(ClientHandlerInterface)" as the constructor to set the "comm server" to be used for processing requests. Moreover, the preferred methods are: getValue( ) for returning the retrieved value; getValues( ) for returning the retrieved value(s); and getvalues(int) for returning a specific element of the array of retrieved values.

Class com.package.main.GetString has a public class of "GetString", extends GetRef, and implements Serializable. In particular, the GetString class is a Bean that is used to read the bytes in a set of registers 'on demand' and interpret them as an 8-bit ASCII character string. The quantity of references to be read is set to the number of characters to be read, not the number of registers.

In this embodiment, the constructor for class com.package.main.GetString is "GetString( )", as the default constructor, and "GetString(ClientHandlerInterface)" as the constructor to set the "comm server" to be used for processing requests. Moreover, the preferred method is getValue( ) for returning the retrieved value.

Class com.package.main.GetUDInt has a public class of "GetUDInt", extends GetRef, and implements Serializable. In particular, the GetUDInt class is a Bean that is used to read a variable or register(s) reference on demand. Each reference is treated as an unsigned, 32-bit integer. If the address specified for the data item is a variable name, the quantity of references is one (the default), and the variable's data type is UDINT.

In this embodiment, the constructor for class com.package.main.GetUDInt is "GetUDInt( )", as the default constructor, and "GetUDInt(ClientHandlerInterface)" as the constructor to set the "comm server" to be used for processing requests. Moreover, the preferred methods are: getValue( ) for returning the retrieved value; and getValues( ) for returning the retrieved value(s).

Class com.package.main.GetUInt has a public class of "GetUInt", extends GetRef, and implements Serializable. In particular, the GetUInt class is a Bean that is used to read a variable or register(s) reference 'on demand'. Each reference is treated as an unsigned, 16-bit integer. If the address specified for the data item is a variable name, the quantity of references is one (the default), and the variable's data type is UINT.

In this embodiment, the constructor for class com.package.main.GetUInt is "GetUInt( )", as the default constructor, and "GetUInt(ClientHandlerInterface)" as the constructor to set the "comm server" to be used for processing requests. Moreover, the preferred methods are: getValue( ) for returning the retrieved value; getValues( ) for returning the retrieved value(s); and getvalues(int) for returning a specific element of the array or retrieved values.

Class com.package.main.GetUShort has a public class of "GetUShort", extends GetRef, and implements Serializable. In particular, the GetUShort class is a Bean that is used to read a variable or register(s) reference 'on demand'. Each reference is treated as an unsigned, 8-bit integer. If the address specified for the data item is a variable name, the quantity of references is one (the default), and the variable's data type is USHORT.

In this embodiment, the constructor for class com.package.main.GetUShort is "GetUShort( )", as the default constructor, and "GetUShort(ClientHandlerInterface)" as the constructor to set the "comm server" to be used for processing requests. Moreover, the preferred methods are: getValue( ) for returning the retrieved value; getValues( ) for returning the retrieved value(s); and getvalues(int) for returning a specific element of the array or retrieved values.

Class com.package.main.LiveLabelApplet has a public class of "LiveLabelApplet", extends Applet, and implements PropertyChangeListener. In this embodiment, the constructor for class com.package.main.LiveLabelApplet is "LiveLabelApplet( )" and the preferred methods are: init( ), propertyChange(PropertyChangeEvent), and start( ).

Class com.package.main.LiveLabelMgrApplet has a public class of "LiveLabelMgrApplet", extends Applet, and implements Runnable. In this embodiment, the constructor for class com.package.main.LiveLabelMgrApplet is "LiveLabelMgrAppleto" and the preferred methods are: destory( ), getCommBean( ), init( ), run( ), start( ), and stop( ).

Class com.package.main.MonitorAdapter has a public class of "MonitorAdapter", extends Object, and implements PropertyChangeListener and Serializable. In particular, the Monitor class, when connected as a PropertyChangerListener of a "Monitor Bean," converts the Bean's dynamic properties to Strings.

In this embodiment, the constructor for class com.package.main.MonitorAdapter is "MonitorAdapter( )" and the preferred methods are: addPropertyChangeListener(PropertyChangeListener) for adding a property change listener; getRegistered( ) for determining if the reference is registered for continuously monitoring; getStatus( ) for returning the current 'acquisition status' message for the reference; getSubscribed( ) for determining if the reference is currently being continuously monitored; getvalue( ) for returning the numeric value retrieved from PLC as a string (decimal representation); getValues( ) for providing access to the numeric values retrieved from PLC as an array of strings (decimal representation); getvalues(int) for providing access to a specific element of an array of retrieved values; propertyChange(PropertyChangeEvent) which is invoked when a bound property (of the associated "comm bean") is changed; and removePropertyChangeListener(PropertyChangeListener) for removing a property change listener.

Class com.package.main.MonitorBits has a public class of "MonitorBits", extends MonitorRef, and implements Serializable. In particular, the MonitorBits class is a Bean that is used to read continuously a variable or register(s) reference. The size of the resultant BitSet is determined by multiplying the quantity of references times the size (in bits) of each reference. The size of each allowed data type is: BOOL 1 bit SHORT 8 bits USHORT 8 bits INT 16 bits UINT 16 bits DINT 32 bits UDINT 32 bits. If the address specified for the data item is a variable name, the quantity of references is one (the default). Also, for all variable references, it is not necessary to set the data type of the reference. (A variable's data type is always looked-up as part of processing the read request.) If, however, the data type of a variable reference is explicitly set, then is should match the actual data type of the variable.

In this embodiment, the constructor for class com.package.main.MonitorBits is "MonitorBits( )", as the default constructor, and "MonitorBits(ValueAdaptor)" as the constructor to set the "comm server" to be used for processing requests. Moreover, the preferred methods are: getValue( ) for returning the retrieved value; getValuesAsStrings( ) for returning the retrieved value; and setDatatype(short) for setting the data type of the reference that is to be read from PLC.

Class com.package.main.MonitorBool has a public class of "MonitorBool", extends MonitorRef, and implements Serializable. In particular, the MonitorBool class is a Bean that is used to read continuously a variable or discrete(s) reference. If the address specified for the data item is a variable name, the quantity of references is one (the default), and the variable's data type is BOOL.

In this embodiment, the constructor for class com.package.main.MonitorBool is "MonitorBool( )", as the default constructor, and "MonitorBool(ValueAdaptor)" as the constructor to set the "comm server" to be used for processing requests. Moreover, the preferred methods are: getValue( ) for returning the retrieved value; getValues( ) for returning the retrieved value(s); and getvalues(int) for returning a specific element of the array or retrieved values.

Class com.package.main.MonitorDInt has a public class of "MonitorDInt", extends MonitorRef, and implements Serializable. In particular, the MonitorDInt class is a Bean that is used to read continuously a variable or register(s) reference. Each reference is treated as a signed, 32-bit integer. If the address specified for the data item is a variable name, the quantity of references is one (the default), and the variable's data type is DINT.

In this embodiment, the constructor for class com.package.main.MonitorDInt is "MonitorDInt( )", as the default constructor, and "MonitorDInt(ValueAdaptor)" as the constructor to set the "comm server" to be used for processing requests. Moreover, the preferred methods are: getValue( ) for returning the retrieved value; getValues( ) for returning the retrieved value(s); and getvalues(int) for returning a specific element of the array of retrieved values.

Class com.package.main.MonitorInt has a public class of "MonitorInt", extends MonitorRef, and implements Serializable. In particular, the MonitorInt class is a Bean that is used to read continuously a variable or register(s) reference. Each reference is treated as a signed, 16-bit integer. If the address specified for the data item is a variable name, the quantity of references is one (the default), and the variable's data type is INT.

In this embodiment, the constructor for class com.package.main.MonitorInt( ) is "MonitorInt( )", as the default constructor, and "MonitorInt(ValueAdaptor)" as the constructor to set the "comm server" to be used for processing requests. Moreover, the preferred methods are: getValue( ) for returning the retrieved value; getValues( ) for returning the retrieved value(s); and getvalues(int) for returning a specific element of the array of retrieved values.

Class com.package.main.MonitorNumber has a public class of "MonitorNumber", extends MonitorRef, and implements Serializable. In particular, the MonitorNumber class is a Bean that is used to read continuously a variable or register(s) reference. The data type of the reference(s) is a settable property. If the address specified for the data item is a variable name, the quantity of references is one (the default). Also, for all variable references, it is not necessary to set the data type of the reference. (A variable's data type is looked-up as part of processing the read request.) If, however, the data type of a variable reference is explicitly set, then is should match the actual data type of the variable.

In this embodiment, the constructor for class com.package.main.MonitorNumber is "MonitorNumber( )", as the default constructor, and "MonitorNumber(ValueAdaptor)" as the constructor to set the "comm server" to be used for processing requests. Moreover, the preferred methods are: getValue( ) for returning the retrieved value; getValues( ) for returning the retrieved value(s); getvalues(int) for returning a specific element of the array of retrieved values; and setDatatype(short) for setting the data type of the reference that is to be read from PLC.

Class com.package.main.MonitorReal has a public class of "MonitorReal", extends MonitorRef, and implements Serializable. In particular, the MonitorReal class is a Bean that is used to read continuously a variable or register(s) reference. Each reference is treated as a 32-bit IEEE floating point number. If the address specified for the data item is a variable name, the quantity of references is one (the default), and the variable's data type is REAL.

In this embodiment, the constructor for class com.package.main.MonitorReal is "MontorReal( )", as the default constructor, and "GetReal(ClientHandlerInterface)" as the constructor to set the "comm server" to be used for processing requests. Moreover, the preferred methods are: getValue( ) for returning the retrieved value; getValues( ) for returning the retrieved value(s); and getvalues(int) for returning a specific element of the array of retrieved values.

Class com.package.main.MonitorRef has a public class of "MonitorRef", extends ReadRef, and implements ServerChangeListener and Serializable. In particular, the MonitorRef class is the common base for all the Monitor Beans. Moreover, the preferred methods of this class are: deregister( ) for deregistering the data item for continuous monitoring; getSubscribeStatus( ) for returning the Subscribe Status' for the reference; getXactID( ) for returning the 'Transaction ID' for the reference; isRegistered( ) for determining if the reference is registered for continuously monitoring; isSubscribed( ) for determining if the reference is currently being continuously monitored; register( ) for registering the data item for continuous monitoring; serverChanged(ServerChangeEvent) which is invoked when the comm server changes; setAddress(String) for setting the address for the reference; setQuantity(short) for setting the number of data items to be monitored; updateValue (ValueChangeEvent) which is invoked by comm server when the value or status of the monitored data item changes.

Class com.package.main.MonitorShort has a public class of "MonitorShort", extends MonitorRef, and implements Serializable. In particular, the MonitorShort class is a Bean that is used to read continuously a variable or register(s) reference. Each reference is treated as a signed, 8-bit integer. If the address specified for the data item is a variable name, the quantity of references is one (the default), and the variable's data type is SHORT.

In this embodiment, the constructor for class com.package.main.MonitorShort is "MonitorShort( )", as the default constructor, and "MonitorShort(ValueAdaptor)" as the constructor to set the "comm server" to be used for processing requests. Moreover, the preferred methods are: getValue( ) for returning the retrieved value; getValues( ) for returning the retrieved value(s); and getvalues(int) for returning a specific element of the array or retrieved values.

Class com.package.main.MonitorString has a public class of "MonitorString", extends MonitorRef, and implements Serializable. In particular, the MonitorString class is a Bean that is used to read continuously the bytes in a set of registers and interpret them as an 8-bit ASCII character string. The quantity of references to be read is set to the number of characters to be read, not the number of registers.

In this embodiment, the constructor for class com.package.main.MonitorString is "MonitorString( )", as the default constructor, and "MonitorString(ValueAdaptor)" as the constructor to set the "comm server" to be used for processing requests. Moreover, the preferred method is getValue( ) for returning the retrieved value.

Class com.package.main.MonitorUDInt has a public class of "MonitorUDInt", extends MonitorRef, and implements Serializable. In particular, the MonitorUDint class is a Bean that is used to read continuously a variable or register(s) reference. Each reference is treated as an unsigned, 32-bit integer. If the address specified for the data item is a variable name, the quantity of references is one (the default), and the variable's data type is UDINT.

In this embodiment, the constructor for class com.package.main.MonitorUDInt is "MonitorUDInt( )", as the default constructor, and "MonitorUDInt(ValueAdaptor)" as the constructor to set the "comm server" to be used for processing requests. Moreover, the preferred methods are: getValue( ) for returning the retrieved value; and getValues( ) for returning the retrieved value(s).

Class com.package.main.MonitorUInt has a public class of "MonitorUInt", extends MonitorRef, and implements Serializable. In particular, the MonitorUInt class is a Bean that is used to read continuously a variable or register(s) reference. Each reference is treated as an unsigned, 16-bit integer. If the address specified for the data item is a variable name, the quantity of references is one (the default), and the variable's data type is UINT.

In this embodiment, the constructor for class com.package.main.MonitorUInt is "MonitorUInt( )", as the default constructor, and "MonitorUInt(ValueAdaptor)" as the constructor to set the "comm server" to be used for processing requests. Moreover, the preferred methods are: getValue( ) for returning the retrieved value; and getValues( ) for returning the retrieved value(s).

Class com.package.main.MonitorUShort has a public class of "MonitorUShort", extends MonitorGetRef, and implements Serializable. In particular, the MonitorUShort class is a Bean that is used to read continuously a variable or register(s) reference. Each reference is treated as an unsigned, 8-bit integer. If the address specified for the data item is a variable name, the quantity of references is one (the default), and the variable's data type is USHORT.

In this embodiment, the constructor for class com.package.main.MonitorUShort is "MonitorUShort( )", as the default constructor, and "MonitorUShort(ValueAdaptor)" as the constructor to set the "comm server" to be used for processing requests. Moreover, the preferred methods are: getValue( ) for returning the retrieved value; getValues( ) for returning the retrieved value(s); and getvalues(int) for returning a specific element of the array or retrieved values.

Class com.package.main.ReadRef has a public class of "ReadRef", extends Ref, and implements Serializable. In particular, the ReadRef class is the common base for all the Get/Monitor Beans. The preferred methods for this class are: getQuantity( ) for returning the number of references that are to be read from the PLC; getValueAsString( ) for returning the retrieved value; and setQuantity(short) for setting the number of references to be read from the PLC.

Class com.package.main.Ref has a public abstract class of "Ref", extends Object, and implements Serializable. In particular, the Ref class is the common base class for all the Get/Monitor Beans. The preferred methods for this class are: addPropertyChangeListener(PropertyChangeListener) for adding a property change listener; getAddress( ) for returning the address that has been set for the reference; getDatatype( ) for returning the data type that has been set for the reference; getStatus( ) for returns the current 'acquisition status' code for the reference; removePropertyChangeListener(PropertyChangeListener) for removing a property change listener; and setAddress (String) for setting the address for the reference.

Class com.package.main.ServerChangeEvent has a public class of "ServerChangeEvent", extends EventObject, and implements Serializable. In particular, this class is the event object that is fired when the comm server is changed. This class is preferably needed only for connecting the individual Get/Set/Monitor Beans with an instance of CommBean in a Bean Box.

In this embodiment, the constructor for class com.package.main.SeverChangeEvent is "ServerChangeEvent (Object, ClientHandlerInterface, ValueAdaptor, VarLookupInterface)". Moreover, the preferred methods are: getAdaptor( ) for returning reference to the current value adapter; getServer( ) for returning reference to the current comm server; and getVarLookup( ) for returning reference to the current namespace server.

Class com.package.main.ServerChangeListener has a public interface of "ServerChangeListener" and extends EventListener. In particular, this interface identifies a class capable of receiving ServerChangeEvent objects. Preferably, this interface is used to connect an instance of CommBean to the individual Get/Set/Monitor Beans, which all implement this interface. This interface is preferably needed only for connecting Beans in a Bean Box. The preferred method is serverChanged(ServerChangeEvent) which is invoked when the comm server changes.

Class com.package.main.SetBits has a public class of "SetBits", extends SetRef, and implements Serializable. In particular, the SetBits class is a Bean that is used to write a variable or register(s) reference 'on demand'. The value to be written is specified using a Java BitSet. The size of the BitSet is determined by multiplying the quantity of references times the size (in bits) of each reference. The size of each allowed data type is: BOOL 1 bit SHORT 8 bits USHORT 8 bits INT 16 bits UINT 16 bits DINT 32 bits UDINT 32 bits If the address specified for the data item is a variable name, the quantity of references is one (the default). Also, for all variable references, it is not necessary to set the data type of the reference. (A variable's data type is looked-up as part of processing the read request.) If, however, the data type of a variable reference is explicitly set, then it matches exactly the actual data type of the variable.

In this embodiment, the constructor for class com.package.main.SetBits is "SetBits", as the default constructor, and "SetBits(ClientHandlerInterface) as the constructor to set the 'comm server' to be used for processing requests. Moreover, the preferred methods are: getQuantity( ) for returning the number of references to be written to the PLC; getValue( ) for returning the value to be written to the PLC; getValueAsString( ) for returning the value to be written to the PLC; sendValue( ) for initiating the sending of the value to the PLC; setDatatype(short) for setting the data type of the reference that is to be written to the PLC; setQuantity(short) for setting the number of references (NOT the number of bits) to be written to the PLC; and setValue(BitSet) for setting the value to be written to the PLC.

Class com.package.main.SetBool has a public class of "SetBool", extends SetRef, and implements Serializable. In particular, the SetBool class is a Bean that is used to write a variable or discrete(s) reference 'on demand'. If the address specified for the data item is a variable name, the quantity of references is one (the default), and the variable's data type is BOOL.

In this embodiment, the constructor for class com.package.main.SetBool is "SetBool( )", as the default constructor, and "SetBool(ClientHandlerInterface) as the constructor to set the 'comm server' to be used for processing requests. Moreover, the preferred methods are: getValue( ) for returning the value to be written to the PLC; getValues( ) for returning the values to be written to the PLC; getvalues(int) for returning a specific element of the array of values to be written to the PLC; getvalue(boolean) for setting a single value to be written to the PLC; getValues(boolean[ ]) for setting the values to be written to the PLC; and setValues (int,boolean) for setting a specific element of the array of values to be written to the PLC.

Class com.package.main.SetDInt has a public class of "SetDInt", extends SetRef, and implements Serializable. In particular, the SetDInt class is a Bean that is used to write a variable or register(s) reference 'on demand'. Each reference is treated as a signed, 32-bit integer. If the address specified for the data item is a variable name, the quantity of references is one (the default), and the variable's data type is DINT.

In this embodiment, the constructor for class com.package.main.SetDInt is "SetDInt( )", as the default constructor, and "SetDInt(ClientHandlerInterface)" as the constructor to set the 'comm server' to be used for processing requests. In addition, the preferred methods are: getValue( ) for returning the value to be written to the PLC; getValues( ) for returning the values to be written to the PLC; getvalues(int) for returning a specific element of the array of values to be written to the PLC; getvalue(int) for setting a single value to be written to the PLC; getvalues(int, int) for setting a specific element of the array of values to be written to the PLC; and getValues(int[ ]) for setting the values to be written to the PLC Class com.package.main.SetInt has a public class of "SetInt", extends SetRef, and implements Serializable. In particular, the Setint class is a Bean that is used to write a variable or register(s) reference 'on demand'. Each reference is treated as a signed, 16-bit integer. If the address specified for the data item is a variable name, the quantity of references is one (the default), and the variable's data type is INT.

In this embodiment, the constructor for class com.package.main.SetInt is "SetInt( )", as the default constructor, and "SetInt(ClientHandlerInterface)" as the constructor to set the "comm server" to be used for processing requests. Moreover, the preferred methods are: getValue( ) for returning the value to be written to the PLC; getValues( ) for returning the values to be written to the PLC; getvalues(int) for returning a specific element of the array of values to be written to the PLC; getvalue(short) for setting a single value to be written to the PLC; getvalues(int, short) for setting a specific element of the array of values to be written to the PLC; and getValues(short[ ]) for setting the value to be written to the PLC.

Class com.package.main.SetNumber has a public class of "SetNumber", extends SetRef, and implements Serializable. In particular, the SetNumber class is a Bean that is used to write a variable or register(s) reference 'on demand'. The data type of the reference(s) is a settable property. If the address specified for the data item is a variable name, the quantity of references is one (the default). Also, for all variable references, it is not necessary to set the data type of the reference. (A variable's data type is looked-up as part of processing the read request.) If, however, the data type of a variable reference is explicitly set, then it should match the actual data type of the variable.

In this embodiment, the constructor for class com.package.main.SetNumber is "SetNumber( )", as the default constructor, and "SetNumber(ClientHandlerInterface)" as the constructor to set the "comm server" to be used for processing requests. Moreover, the preferred methods are: getValue( ) for returning the value to be written to the PLC; getValues( ) for returning the values to be written to the PLC; getvalues(int) for returning a specific element of the array of values to be written to the PLC; setDatatype(short) for setting the data type of the reference that is to be written to the PLC; getvalue(Number) for setting a single value to be written tot he PLC; getvalues(int, Number) for setting a specific element of the array of values to be written to the PLC; and getValues(Number[]) for setting the values to be written to the PLC.

Class com.package.main.SetReal has a public class of "SetReal", extends SetRef, and implements Serializable. In particular, the SetReal class is a Bean that is used to write a variable or register(s) reference 'on demand'. Each reference is treated as a 32-bit IEEE floating point number. If the address specified for the data item is a variable name, the quantity of references is one (the default), and the variable's data type is REAL.

In this embodiment, the constructor for class com.package.main.SetReal is "SetReal( )", as the default constructor, and "SetReal(ClientHandlerInterface)" as the constructor to set the "comm server" to be used for processing requests. Moreover, the preferred methods are: getValue( ) for returning the value to be written to the PLC; getValues( ) for returning the values to be written to the PLC; getvalues(int) for returning a specific element of the array of values to be written to the PLC; getvalue(float) for setting a single value to be written to the PLC; getValues(float[ ]) for setting the values to be written to the PLC; and getvalues(int, float) for setting a specific element of the array of values to be written to the PLC Class com.package.main.SetRef has a public class of "SetRef", extends Ref, and implements ServerChangeListener and Serializable. In particular, the SetRef class is the common base class for all the 'Set' Beans. The methods of this class are: doAction( ) for initiating the sending of value(s) to the PLC; getQuantity for returning the number of references to be written to the PLC; sendValues( ) for initiating the sending of the value(s) to the PLC; and serverChanged(ServerChangeEvent) for invoking when the comm server changes.

Class com.package.main.SetShort has a public class of "SetShort", extends SetRef, and implements Serializable. In particular, the SetShort class is a Bean that is used to write a variable or register(s) reference 'on demand'. Each reference is treated as a signed, 8-bit integer. If the address specified for the data item is a variable name, the quantity of references is one (the default), and the variable's data type is SHORT.

In this embodiment, the constructor for class com.package.main.SetShort is "SetShort( )", as the default constructor, and "SetShort(ClientHandlerInterface)" as the constructor to set the "comm server" to be used for processing requests. Moreover, the preferred methods are: getValue( ) for returning the value to be written to the PLC; getValues( ) for returning the values to be written to the PLC; getvalues (int) for returning a specific element of the array of values to be written to the PLC; getvalue(byte) for setting a single value to be written to the PLC; getValues(byte[ ]) for setting the values to be written to the PLC; and getvalues(int, byte) for setting a specific element of the array of values to be written to the PLC.

Class com.package.main.SetString has a public class of "SetString", extends SetRef, and implements Serializable. In particular, the SetString class is a Bean that is used to write a String to a set of registers 'on demand'. The String is written as a series of 8-bit ASCII characters. If the address specified for the data item is a variable name, the variable's data type is STR.

In this embodiment, the constructor for class com.package.main.SetString is "SetString( )", as the default constructor, and "SetString(ClientHandlerInterface)" as the constructor to set the "comm server" to be used for processing requests. Moreover, the preferred methods are: getValue( ) for returning the value to be written to the PLC; and setValue(String) for setting the value to be written to the PLC.

Class com.package.main.SetUDInt has a public class of "SetUDInt", extends SetRef, and implements Serializable. In particular, the SetUDInt class is a Bean that is used to write a variable or register(s) reference 'on demand'. Each reference is treated as an unsigned, 32-bit integer. If the address specified for the data item is a variable name, the quantity of references is one (the default), and the variable's data type is UDINT.

In this embodiment, the constructor for class com.package.main.SetUDInt is "SetUDInt( )", as the default constructor, and "SetUDInt(ClientHandlerInterface)" as the constructor to set the "comm server" to be used for processing requests. Moreover, the preferred methods are: getValue( ) for returning the value to be written to the PLC; getvalues( ) for returning the values to be written to the PLC; getvalues(int) for returning a specific element of the array of values to be written to the PLC; getvalue(long) for setting a single value to be written to the PLC; setValues(int, long) for setting a specific element of the array of values to be written to the PLC; and getValues(long[ ]) for setting the values to be written to the PLC.

Class com.package.main.SetUInt has a public class of "SetUInt", extends SetRef, and implements Serializable. In particular, the SetUInt class is a Bean that is used to write a variable or register(s) reference 'on demand'. Each reference is treated as an unsigned, 16-bit integer. If the address specified for the data item is a variable name, the quantity of references is one (the default), and the variable's data type is UINT.

In this embodiment, the constructor for class com.package.main.SetUInt is "SetUInt( )", as the default constructor, and "SetUInt(ClientHandlerInterface)" as the constructor to set the "comm server" to be used for processing requests. Moreover, the preferred methods are: getvalue( ) for returning the value to be written to the PLC; getValues( ) for returning the values to be written to the PLC; getvalues(int) for returning a specific element of the array of values to be written to the PLC; getvalue(int) for setting a single value to be written to the PLC; getvalues(int, int) for setting a specific element of the array of values to be written to the PLC; and getValues(int[ ]) for setting the value to be written to the PLC.

Class com.package.main.SetUShort has a public class of "SetUShort", extends SetRef, and implements Serializable. In particular, the SetUShort class is a Bean that is used to write a variable or register(s) reference 'on demand'. Each reference is treated as an unsigned, 8-bit integer. If the address specified for the data item is a variable name, the quantity of references is one (the default), and the variable's data type is USHORT.

In this embodiment, the constructor for class com.package.main.SetUShort is "SetUShort( )", as the default constructor, and "SetUShort(ClientHandlerInterface)" as the constructor to set the "comm server" to be used for processing requests. Moreover, the preferred methods are: getValue( ) for returning the value to be written to the PLC; getvalues( ) for returning the values to be written to the PLC; getvalues (int) for returning a specific element of the array of values to be written to the PLC; getvalue(short) for setting a single value to be written to the PLC; getvalues(int, short) for setting a specific element of the array of values to be written to the PLC; and getValues(short[ ]) for setting the values to be written to the PLC.

Package com.package.namespace includes classes: com.package.namespace.VarLookupInterface; com.package.namespace.VerInfo; and com.package.main.ConnectPLC.

Class com.package.namespace.VarLookupInterface has a public interface of "VarLookupInterface" and includes the methods of: get(String); getSymbols( ); getVerInfo( ); init (InetAddress); and isReadOnly(String, int).

Class com.package.namespace.VerInfo has a public class of "VerInfo", extends Object, and implements Serializable. In this embodiment, the constructor for class com.package.namespace.VerInfo is: "VerInfo( )", "VerInfo(String)", "VerInfo(String, long, int)", and "VerInfo(String, String). Moreover, the preferred methods are: equals(Object); readData(BufferedReader) for reading delimited data from a file; toString( ); and writeData(PrintWriter) for writing delimited data to a file.

Package com.package.vars includes the class com.package.vars.VarInfo having a public class of "VarInfo", extending Object, and implementing Serializable. The constructors include VarInfo( ) and VarInfo(String, String, int, int, short, short, short, boolean. The methods include: getAddress( ); getDataType( ); getName( ); getOffset( ); getSymbolID( ); getSymbolType( ); getVariableType( ); IsReadOnly( ); readData(BufferedReader) for reading delimited data from a file; setAddress(String); setDataType(short); setName (String); setOffset(int); setReadOnly(boolean); setSymbolID(int); setSymbolType(short); setVariableType (short); and writeData(PrintWriter) for writing delimited data to a file.

While the specific embodiments have been illustrated and described, numerous modifications come to mind without significantly departing from the spirit of the invention and the scope of protection is only limited by the scope of the accompanying claims.

What is claimed is:

1. An interface for communicating between a controller and a network client having a conventional web browser comprising:
   an archive for compiling an application written in code supported by the web browser;
   the interface responsive to the application for establishing a connection between the controller and the network client;
   a subscription list for polling the controller for data items requested by the network client; and,
   a plurality of JAVAbeans responsive to the application for supporting communication between the controller and the network client upon establishing a connection therebetween.

2. The interface of claim 1, further comprising a client handler operably attached to the network client and the controller for maintaining the connection between the controller and the network client.

3. The interface of claim 2, further comprising a value adaptor operably attached to the network client for dispatching unsolicited data messages to the network client.

4. The interface of claim 3, further comprising a server handler operably attached to the value adaptor for providing unsolicited data updates to the value adaptor.

5. The interface of claim 1, further comprising an update queue operably attached to the subscription list for providing a buffering of the data updates.

6. An interface for communicating between a controller and a network client having a conventional web browser, comprising:
   an archive for compiling an application written in conventional code supported by the web browser;
   the interface responsive to the application for establishing a connection between the controller and the network client;
   a subscription list for polling the controller for data items requested by the network client; and,
   a library responsive to the application for supporting data requests between the controller and the network client upon establishing a connection therebetween, the library including a client handler operably attached to the network client and the controller for maintaining the connection between the controller and the network client.

7. The interface of claim 6, further comprising a value adaptor operably attached to the network client for dispatching unsolicited data messages to the network client.

8. The interface of claim 7, further comprising a server handler operably attached to the value adaptor for providing unsolicited data updates to the value adaptor.

9. The interface of claim 6, further comprising an update queue operably attached to the subscription list for providing a buffering of the data updates.

10. An interface for communicating between a controller and a network client having a conventional web browser, comprising:
    an archive for compiling an application written in conventional code supported by the web browser;
    the interface responsive to the application for establishing a connection between the controller and the network client;
    a subscription list for polling the controller for data items requested by the network client; and,
    a library responsive to the application for supporting data requests between the controller and the network client upon establishing a connection therebetween, the library including a client handler operably attached to the network client and the controller for maintaining the connection between the controller and the network client and a value adaptor operably attached to the network client for dispatching unsolicited data messages to the network client.

11. The interface of claim 10, further comprising a server handler operably attached to the value adaptor for providing unsolicited data updates to the value adaptor.

12. The interface of claim 10, further comprising an update queue operably attached to the subscription list for providing a buffering of the data updates.

13. An application interface for communicating between a controller and a network client having a conventional web browser, the application interface comprising:
    an archive for storing a class file utilized to compile an application, the application being supported by the web browser;
    a subscription list for polling the controller for data items requested by the network client; and, a library responsive to the application for supporting communication between the controller and the network client upon establishing a connection therebetween.

14. The application interface of claim 13 wherein the library facilitates the creation of a web page interactive with the application.

15. A method for facilitating communication between a controller and a network client having a web browser, the method comprising the steps of:

providing an archive containing a plurality of classes for writing an application;

providing a subscription list for polling the controller for data items requested by the network client; providing a library, the library being responsive to the application for supporting communication between the controller and the network client upon establishing a connection therebetween; and, creating a web page by utilizing the application, the web page being interactive with the application.

16. The method of claim 15 further comprising loading the web page on the controller, wherein the web page can be monitored by the network client.

17. The method of claim 15 further comprising loading the web page on a server, the server being operably connected to the controller, wherein the web page can be monitored by the network client.

* * * * *